(12) United States Patent
Iketaki et al.

(10) Patent No.: US 6,859,313 B2
(45) Date of Patent: Feb. 22, 2005

(54) SUPER RESOLUTION MICROSCOPE

(75) Inventors: Yoshinori Iketaki, Oume (JP);
Masaaki Fujii, Okazaki (JP);
Takashige Omatsu, Yokohama (JP);
Kimihisa Yamamoto, Tokyo (JP);
Toshio Suzuki, Chiba (JP)

(73) Assignees: Japan Science & Technology Corporation, Kawaguchi (JP);
Olympus Optical Co., Ltd., Tokyo (JP); Nippon Roper KK, Chiba (JP)

( * ) Notice: Subject to any disclaimer, the term of this patent is extended or adjusted under 35 U.S.C. 154(b) by 0 days.

(21) Appl. No.: 10/103,190

(22) Filed: Mar. 21, 2002

(65) Prior Publication Data

US 2002/0167724 A1 Nov. 14, 2002

(30) Foreign Application Priority Data

Mar. 23, 2001 (JP) ........................................ 2001-084823
Aug. 28, 2001 (JP) ........................................ 2001-257395

(51) Int. Cl.[7] ............................................. G02B 21/06
(52) U.S. Cl. ..................................... 359/385; 250/458.1
(58) Field of Search ................................ 359/368, 385, 359/388, 370; 250/458.1, 459.1, 461.1, 461.2

(56) References Cited

U.S. PATENT DOCUMENTS 5,450,463 A * 9/1995 Iketaki ........................ 378/43
6,108,081 A * 8/2000 Holtom et al. ............... 356/301

FOREIGN PATENT DOCUMENTS

| JP | 08-184552 A | 7/1996 |
| JP | 10-142151 A | 5/1998 |
| JP | 11-095120 A | 4/1999 |
| JP | 2001-100102 A | 4/2001 |

OTHER PUBLICATIONS

Yasuo Okuzawa, Masaaki Fujii and Mitsuo Ito: "Direct Observation of Second Excited $^{1,3}$ (n,n*) States of Pyrazine by UV–IR Double Resonance Dip Spectroscopy", Chemical Physics Letters, vol. 171, No. 4, Aug. 10, 1990—entire document.

* cited by examiner

Primary Examiner—Mark A. Robinson
Assistant Examiner—Lee Fineman
(74) Attorney, Agent, or Firm—Frishauf, Holtz, Goodman & Chick, P.C.

(57) ABSTRACT

A microscope includes a first light source to emit a first light to excite a molecule of a sample to a higher energy level vibration state which belongs to a lowest energy level electron state from the ground state, a second light source to emit a second light source to excite the molecule to a higher energy level quantum state from the higher energy vibration state, an optical system to overlap the first light and the second light partially on the sample, and an optical detector to detect a given fluorescence from the irradiated region of the first light and the second light on the sample.

12 Claims, 27 Drawing Sheets

Phase distribution of pumping light beam
Phase distribution of probe light beam
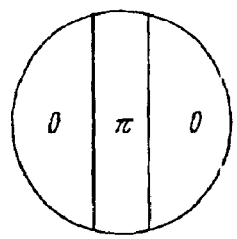
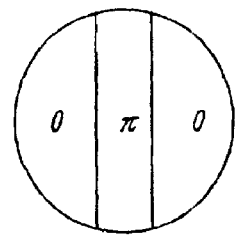
FIG. 12a
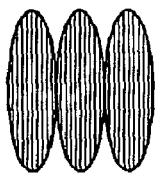
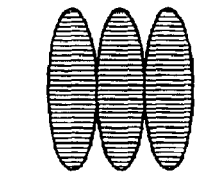
Intensity distribution of focused pumping light
Intensity distribution of focused probe light
FIG. 12b
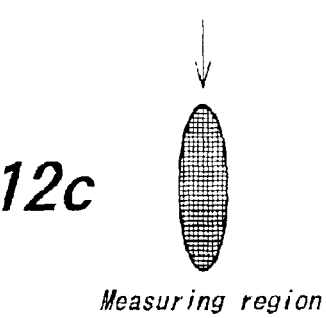
Infrared double resonance absorption signal-generating region
FIG. 12c
Measuring region Phase distribution of pumping light beam  Phase distribution of probe light beam
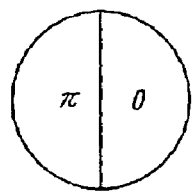  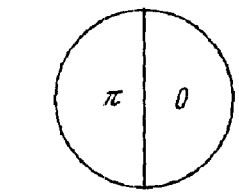
FIG. 13a
  
Intensity distribution of focused pumping light    Intensity distribution of focused probe light
FIG. 13b
Infrared double resonance absorption signal-generating region
FIG. 13c
Measuring region Phase distribution of pumping light beam
Phase distribution of probe light beam
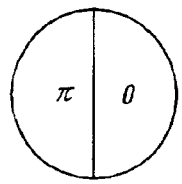
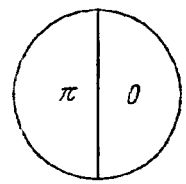
FIG. 14a
Intensity distribution of focused pumping light
Intensity distribution of focused probe light
FIG. 14b
Infrared double resonance absorption signal-generating region Measuring region

SUPER RESOLUTION MICROSCOPE

BACKGROUND OF THE INVENTION

1. Field of the Invention

The present invention relates to a microscope, particularly a sophisticated microscope using lights of two wavelengths including at least infrared ray or near infrared ray where one light corresponds to the resonance wavelength between the ground state and a given vibration state of a molecule or a given crystalline structure in a sample, and the other light corresponds to an exciting wavelength between the given excited state and a higher electron excited state, and then, by overlapping the lights partially in space and irradiating on the sample, an optical response (e.g., fluorescence) from the sample is observed in a minute region smaller than the diffraction limit of the resulting overlapped light, to detect a chemical group of the sample supersensitively which is characterized by a given vibration.

This invention also relates to a microscope using two kinds of light such as a pumping light and an erasing light where in a super resolution state to repress a fluorescent light-emitting region which is obtained by the pumping light under the diffraction limit by the erasing light, a background signal which results from a scattered light or a side-excitation process by irradiating the erasing light for a sample to be observed, and thus, the spatial resolution and thus, the image quality for the sample is developed.

2. Description of the Relates Art

Technology of optical microscopy has long been developed, resulting in the invention of various types of microscopes. Moreover, microscope systems with improved performance have been developed in recent years due to advances in related technologies beginning with laser technology and electron imaging technology.

Recently, a fluorescence microscope having a high spatial resolution beyond a diffraction limit by using double-resonance absorption is proposed in Japanese Patent Application No. Kokai Hei 10-142151 (JP A 10-142151). FIG. 1 is a conceptual view showing the process of double-resonance absorption that occurs in a molecule. The molecule in the ground state $S0$ is excited to $S1$, which is a first excited state, due to light at wavelength $\lambda 1$. Furthermore, this shows excitation to $S2$, which is a second excited state, due to light at wavelength $\lambda 2$. This also shows the case of extremely weak fluorescence from $S2$.

Extremely interesting phenomena occur in the case of a molecule that has the optical properties indicated in FIG. 1. FIG. 2 is a conceptual view of the double-resonance absorption process, in the same manner as FIG. 1, wherein the horizontal X axis indicates width of spatial distance, spatial region Al being irradiated by light of wavelength $\lambda 2$, spatial region A0 not being irradiated by light of wavelength $\lambda 2$.

In FIG. 2, numerous molecules are generated in the $S1$ state due to excitation by light of wavelength $\lambda 1$ at spatial region A0, and then fluorescence is visible due to light emission at wavelength $\lambda 3$ from spatial region A0. However, since spatial region A1 is irradiated by light of wavelength $\lambda 2$, most molecules in the $S1$ state are immediately exited to the high $S2$ state such that molecules in the $S1$ state aren't present. This type of phenomenon is confirmed for any number of molecules. By this means, even if fluorescence of wavelength $\lambda 3$ entirely disappears, fluorescence itself at the A1 region becomes entirely controllable since there was no fluorescence originally from the $S2$ state. Therefore fluorescence occurs only in the A0 spatial region.

This result has extremely important meaning when considered from the standpoint of the applied field of microscopy. That is, in a conventional scanning-type laser microscope, etc., a laser light is concentrated into a microbeam by means of a condensing lens and then, is scanned across a sample to be observed. During this process, microbeam size becomes that of the diffraction limit determined by wavelength and the numerical aperture of the condensing lens, and spatial resolution better than this limit can't be anticipated.

However, in the case of FIG. 2, two types of light (wavelength $\lambda 1$ and wavelength $\lambda 2$) are skillfully combined spatially, and the fluorescence region is controlled by irradiation of light of wavelength $\lambda 2$. Therefore, for example, upon consideration of the region of irradiation of light of wavelength $\lambda 1$, the fluorescence region can be made narrower than even that of the diffraction limit determined by wavelength and numerical aperture of the condensing lens. Therefore this principle can be utilized to make possible a super-resolution microscope (e.g. a fluorescence microscope) using double-resonance absorption to exceed the diffraction limit.

Moreover, for developing the super resolution of a super resolution microscope, such a technique is disclosed in Japanese Patent Application No. Kokai Hei 11-95120(JP A 11-95120) as employing a fluorescence labeler molecules or two types of light of wavelength of $\lambda 1$ and wavelength of $\lambda 2$, in order to enhance the functions of the super resolution microscope. In this technique, three quantum states including at least a ground state are defined. Then, to a sample to be observed are combined fluorescent probe molecules to dye various molecules which are transited through thermal relaxation rather than fluorescent thermal relaxation in the deexcitation to the ground state from the higher energy level excited state without the first excited state and biomolecules to which a dying technique is performed biochemically. Then, the sample is excited to state $S1$ by the light of wavelength of $\lambda 1$ to excite the molecules for dying, and subsequently, excited to a higher energy level quantum state. In this case, the fluorescent light can be repressed. In this way, if the spatial fluorescent region is narrowed artificially, the spatial resolution of the super resolution microscope can be developed.

Such an optical property of molecule as mentioned above can be explained quantum chemically. That is, generally molecules are comprised of various atoms bounded by $\pi$ or $\sigma$ bonds. In other words, molecular orbitals of a molecule exist as $\pi$ molecular orbitals or $\sigma$ molecular orbitals, and electrons present in these molecular orbitals take on the important role of bonded the various atoms. Among such molecular orbitals, electrons of $\sigma$ molecular orbitals strongly bond the various atoms and determine inter-atomic distances within the molecule that form the skeleton of the molecule. In contrast, an electron in a $\pi$ molecular orbital contributes almost nothing to bonding of the various atoms and instead restrains the entire molecule with an extremely weak force.

In many cases, when light excites an electron in a $\sigma$ molecular orbital, inter-atomic spacing of the molecule changes greatly, and large structural changes occur which include dissociation of the molecule. As a result, kinetic energy of the atoms and energy imparted to the molecule by light are mostly changed into thermal energy due to structural change. Therefore excitation energy isn't consumed in the form of the light called fluorescence. Moreover, even if fluorescence were assumed to occur during this process, the duration of such fluorescence would be extremely short since structural change of a molecule is extremely fast (shorter than the order of picosecond).

In contrast, an electron in a π orbital has the property of excitation with nearly no effect upon molecular structure itself, staying for a long period of time in an excited quantum state of high quantum discrete position, and subsequent decaying by emission of fluorescence on the order of nano-second.

According to quantum chemistry, possession of a π molecular orbital by a molecule is equivalent to possession of a double bond so that an essential condition for selection of the utilized fluorescent labeler molecule becomes the possession of abundant double bonds. However, even among molecules having double bonds, six member rings such as benzene and pyridine have been confirmed to have extremely weak fluorescence from the excited state S2 (e.g., M. Fuji, et al., Chem. Phys. Lett. 171(1990)341).

Therefore if a molecule having six member rings, such as benzene, pyridine, etc., is selected as a fluorescence labeler molecule, the lifetime of fluorescence from the state S1 would be long, and fluorescence from the molecule would be readily controlled by excitation from the state S1 to the state S2 by photo-activation. Therefore, effective use becomes possible for super-resolution. That is, if observation is carried out after dying by such a fluorescence labeler molecule, not only does it become possible to observe a fluorescent image of the sample at high spatial resolution, but it also is possible to selectively dye only particular chemical structures of the biological sample, and it becomes possible to analyze even the detailed chemical structures of the sample.

Moreover, since double-resonance absorption generally only occurs when particular conditions are satisfied, such as polarization state and wavelengths of the two types of light, these conditions can be utilized to learn the structure of the molecule in extremely fine detail. That is, the double-resonance absorption process occurs strongly when there is a strong correlation between polarization direction of the light and orientation direction of the molecule, and when the molecular orientation direction has a particular angle relative to respective polarization directions of the lights of the two wavelengths. Therefore the extent that fluorescence disappears can be varied by irradiating the sample simultaneously with light of two wavelengths and the rotating polarization direction of each respective light. Therefore from such variation, spatial orientation information can be obtained for the tissue under observation. This is also possible by adjustment of the two wavelengths of light.

As mentioned above, according to the technique disclosed in Japanese Patent Application No. Kokai Hei 11-95120, the higher analysis can be realized, in addition to the super high resolution. Moreover, by controlling the timing of period of the irradiation of the two type of lights of wavelength $\lambda 1$ and wavelength $\lambda 2$, the S/N ratio can be improved and the restriction of fluorescence can be realized effectively, and thus, the super resolution can be realized more effectively.

A first concrete embodiment of such a super resolution microscope is disclosed in Japanese Patent Application Kokai 2001-100102. In the embodiment, a light (particularly laser light) of wavelength $\lambda 1$ to excite a fluorescent labeler molecule to the state S1 from the state S0 is employed as a pumping light, and a light of wavelength $\lambda 2$ to excite the fluorescent labeler molecule to the state S2 from the state S1 is employed as an erasing light. Then, as shown in FIG. 3, the pumping light is irradiated from an optical source 11 and the erasing light is irradiated from an optical source 12. The pumping light is reflected at a dichroic mirror 13, and focused on a sample 15 with a ring optical system 14. Then, the erasing light is turned into a hollow beam with a phase plate 16, and passed through the dichroic mirror 13 and combined with the pumping light spatially. Then, the combined light is focused on the sample 15.

In this case, since fluorescent lights around the optical axis where the intensity of the erasing light is made zero does not almost occur, only fluorescent labeler molecules which belongs to a given narrower region ($\Delta<0.61 \cdot \lambda 1/NA$, NA: the aperture of the ring optical system 14) than the spread of the pumping light can be observed, so that the super resolution of the microscope can be developed. The phase plate 16 is constructed so that it can shift the phase of the erasing light by point symmetry for the optical axis.

FIG. 5 is a structural view showing another embodiment (second embodiment) of a conventional super resolution microscope. In this embodiment, a laser light emitted from a Nd:YAG laser 21 is split by a half mirror 22. One split beam is introduced to a dichroic mirror 24 via a triple-wave generator 23. The other split beam is introduced to the dichroic mirror 24 via a mirror 25, a Raman shifter 56, a mirror 27 and a phase plate 28, to be combined with the one beam passing through the triple-wave generator 23. The combined light is focused on a sample 35 held with a cover glass 34 on a mobile stage 33 via a condenser lens 29, a pinhole 30, dichroic mirror 31 and an objective lens 32. The phase plate 28 is constructed so that it can shift the phase of the light by point symmetry for the optical axis, as shown in FIG. 6, and the sample 35 is dye with given fluorescent labeler molecules in advance.

A fluorescent light emitted from sample 35 is passed through objective lens 32, and is split from the approach route by a dichroic mirror 31, introduced into a photo multiplier 40 via a pinhole 36, a sharp cut filter 37, a band-pass filter 38, and a notch filter 39. Here, the sharp cut filter 37, the band-pass filter 33, and the notch filter 39 are accommodated in a light-shielded box 41, and the pinhole 36 is formed at the light-shielded box 41.

In the super resolution microscope as shown in FIG. 5, a light (laser light) through the triple-wave generator 23 is employed as a pumping light to excite a fluorescent labeler molecule to the state S1 from the state S0, and a light (laser light) through the Ramen shifter 26 is employed as an erasing light to excite the fluorescent labeler molecule to the state S2 from the state S1. Then, the erasing light is turned into a hollow beam by the phase plate 28, and combined spatially with the pumping light by the dichroic mirror 24. In this case, fluorescent light around the optical axis of the erasing light where the intensity of the erasing light is made zero does not almost occur, and thus, only fluorescent labeler molecules which belong to a narrower region than the spread of the pumping light is observed in high resolution.

Moreover, such a high performance microscope is proposed in Japanese Patent Application No. Kokai Hei 8-184552, where by employing double resonance absorption process through the irradiation for a sample to be observed using plural light beams having their respective wavelengths, the chemical analysis can be realized, in addition to the control of the image to be obtained of the sample.

However, according to various types of investigations by the inventors of the present invention, it was found that the observing principle of the conventional super resolution microscope as shown in the first embodiment is excellent in the spatial resolution, but has some problems in informations to be obtained, that is, the structure-resolving (analysis). That is, in the super resolution microscope, although the pumping light and the erasing light are focused on a sample dyed by fluorescent indicator molecules and then, a fluorescent light from the fluorescent indicator molecule is detected, in this case, the luminance mechanism is based on the following fact. That is, due to irradiating pumping light, the fluorescent molecule with the ground state is excited to a vibration state belonging a high electron state. Thereafter, the excited fluorescent molecule is thermally relaxed to the bottom vibration state of the first electron excited state, and then, de-excited to the ground state through the emission of fluorescence (Kasha rule). In this case, only the information of "where being dyed by the fluorescent indicator molecule within the sample" can be obtained.

Whereas, in a bio-science field, since a biogenic sample is employed, the high resolution and real-time observation for the biogenic activity of the tissue of the sample is strongly desired, and also, such a detail information as about the combining portion and the combining condition of a fluorescent indicator molecule for the tissue is required. Moreover, if possible, without the dying for a sample, the high resolution observation for the biogenic activity of the tissue of the sample is acutely required.

Generally, the reason of dying a biochemical sample with a fluorescent indicator molecule is that in almost biogenic molecules, large energies are required to transit the molecules to their first electron excited states from their ground states and thus, a far ultraviolet beam source is required, but as of now, a far ultraviolet laser source for commercial use is not realized, so that a laser microscope system can not constructed in the far ultraviolet region. Although an xenon lamp or a mercury lamp is employed as a far ultraviolet beam source, the luminance of such a light source is weak and is not practicable because the performance of the light source is inferior to that of a laser source in light divergence and optical polarization.

Also, in the super resolution microscope as shown in the second embodiment, the erasing light which has a larger intensity than the pumping light is focused on the sample dyed by the fluorescent indicator molecules simultaneously or in more or less time interval, and the weak signal is selected and amplified at the photo multiplier while the erasing light being irradiated. In the super resolution microscope as shown in FIG. 5, by disposing the various optical filters etc., and controlling the electrical gate at the detection of the fluorescent signal, the optical scattered components of the erasing light and the pumping light are eliminated.

However, if the erasing light having a large intensity is irradiated onto the sample, side-fluorescence due to the complex multi-photon absorption process can not be neglected. Generally, since the wavelength of the erasing light is set within a longer wavelength region than the absorption region to excite the fluorescent molecule to the first electron excited state from the ground state, principally, no fluorescence is observed. Moreover, since the intensity of the erasing light is controlled so that the two photon absorption process can not be generated and thus, the fluorescence due to the absorption process can not generated, fundamentally, any other photon emission process is observed.

Whereas, if the fluorescent indicator molecules are dispersed in the biogenic sample and combined with given chemical groups, the electron structure of the fluorescent molecules may be changed. As a result, the central wavelength of the absorption region to excite the fluorescent molecules may be shifted in a longer wavelength region, and thus, the fluorescent molecules may be excited by the erasing light, so that weak fluorescence may be generated. Moreover, since the fluorescent indicator molecules are chemically bonded with the biogenic organism of the sample, the electron structure of the biogenic sample may be changed, and thus, a given fluorescence may be generated due to the irradiation of the erasing light.

Since such a side-fluorescence signal is superimposed and mixed with the inherent florescence signal to be observed, it is difficult to distinguish from them with an optical filter and electrical gate control as desired. As a result, the intensity of back ground signal is increased and thus, the super resolution and the image quality may be deteriorated.

Therefore, in the case that the high resolution is required, a new technology capable of eliminating the back ground signal is desired essentially because the observation region per one sampling pixel is narrowed and thus, the number of the fluorescent molecules are decreased within the observation region, the inherent fluorescence signal becomes weak.

SUMMERY OF THE INVENTION

It is an object of the present invention to provide a sophisticated microscope using lights of two wavelengths including at least infrared ray or near infrared ray where one light corresponds to the resonance wavelength between the ground state and a given vibration state of a molecule or a given crystalline structure in a sample, and the other light corresponds to an exciting wavelength between the given excited state and a higher electron excited state, and then, by observing the optical response from a narrower region than the diffraction limit, a given chemical group of the sample, which is characterized by a given vibration state, is detected in high resolution.

In order to achieve the above object, according to an embodiment of the present invention a super resolution microscope is provided which includes: a first light source to emit a first light to excite a molecule of a sample from a around state to a higher energy level vibration state which belongs to a lowest energy level electron state; a second light source to emit a second light to excite the molecule from the higher energy vibration state to a higher energy level quantum state; a spatial filter for spatially modulating an intensity of the first and second lights, respectively; an optical system to overlap a part of an irradiation region of the first light and a part of an irradiation region of the second light partially on the sample, and an optical detector to detect a given fluorescence from the irradiated region of the first light and the second light overlapped by the optical system on the sample.

The first light source may emit an infrared light or a near infrared light which has a wavelength of 700 nm or longer.

The microscope may include a phase modulate filter to modulate in intensity at least one of the first light and the second light spatially.

At least one of the first light source and the second light source may be a pulsed light source.

At least one of the first light source and the second light source may be a coherent light source.

At least one of the first light source and the second light source may be a wavelength-variable light source.

The wavelength of the first light may be set to a fundamental vibration or over tone of vibration of a chemical group selected from the group consisting of —CH, —NH, —OH, C=C, C=O, —CH$_2$, —CHOH and —CN.

In the preferred embodiment of the present invention, a first light and a second light which have their respective different wavelengths are employed, and at least one of the lights is composed of a infrared light or near infrared light. Then, the lights are overlapped partially and spatially and then, irradiated onto the sample. In this case, the wavelength of the infrared light or the near infrared light is set to a resonance wavelength to excite the molecule or the crystalline structure of the sample to the given vibration state, and the wavelength of the other light is set to a wavelength to excite to a higher energy level electron excited state from the vibration state, and by observing an optical response (fluorescence) from the sample at the time when the lights are irradiated, a given chemical group which is characterized by the vibration state is detected in high resolution.

The principle of the preferred embodiment will be described hereinafter.

In the preferred embodiment as mentioned above, the infrared light or the near infrared light is employed as a pumping light on double-resonance process. The interaction between the infrared light or the near infrared light and a given substance is very peculiar, and is reflected by the vibration originated from the bonding condition of the atoms of the substance or rotation originated from the structure of a molecule of the sample. The interaction between the infrared light or the near infrared light and the substance is affected sensitively by the vibration and the rotation, and thus, the chemical binding condition due to the chemical group and the environmental condition of the substance in a given sample as well as the detection of an element of the substance can be detected.

The principle will be described hereinafter, with reference to FIG. 7. FIG. 7 shows a quantum structure of a general molecule, and it is apparent from FIG. 7 that plural complicated vibration states and rotation states are belonged to a given electron state. In the other words, in a given substance, electron states which are generated by the change of a valence electron in electron orbit, vibration states which are generated by the change in distance between adjacent atoms through thermal excitation, and rotation states which are generated by the rotation movement of a molecule of the substance are combined complicatedly, and thus, the quantum state of the substance are varied.

Generally, in order to excite a substance, particularly a molecule to the first electron excited state (S1) which is combined with a given vibration-rotation state from the ground state (S0) which is lowest in energy, a light within visible or ultraviolet wavelength region must be irradiated. In the other words, the energy gap between the excited state (S1) and the ground state (S0) is very large, and is about 2 eV in the conversion of photon energy. At the present, in almost biogenic molecules being researched in a life-science field, an ultraviolet or a far ultraviolet beam of very short wavelength is employed as the excitation light, which has a large energy of 4 eV or over in the conversion of photon energy.

On the contrary, in the transition (vibration-rotation excitation) between the vibration state and the rotation state which belong to the same electron state, since the difference in energy between the states is set very small, compared with that of the electron excitation, the photon energy of the light to excite the molecule between the vibration state and the rotation state may be set to be small, so an infrared light or a near infrared light may be employed.

Referring to the above matter of fact, absorption spectra of various substances within an infrared-near infrared region are listed at the chapter of "Infrared-near infrared spectroscopic method" in "Spectroscopic method with in a near infrared wavelength region, measuring method series 32 (1996)", edited by Japanese spectroscopic academic conference and published by Academic Conference Publish Center. In the reference, various absorption lines are confirmed, originated from their vibration-rotation excitations within a longer wavelength region of 700 nm. The absorption lines are originated from the vibration-rotation transitions of chemical groups such as —OH, —$CH_3$, —CH, —$NH_3$ or the like, and the spectra shape are inherent for the substance observed. In this way, the absorption lines, which are often called as a "finger mark of molecule", are completed in detail.

Generally, if the optical response of the absorption line of the substance within the infrared-near infrared region is observed, the material structure of the substance can be clarified. In addition, the chemical group such as —OH, —$CH_3$, —CH, —$NH_3$ of the substance is changed chemically and sensitively if another specific substance (given molecule exists spatially around the substance or the phase around the substance is changed. That is, the absorption line of the substance is varied largely.

Concretely, in an observation using a fluorescent microscope, if a biogenic organism is dyed by fluorescent dye molecules, the molecules are absorbed to given chemical groups or given portions of the biogenic organism physically or chemically. In this case, the electronegativities of the molecules are changed or the absorption spectra of the molecules within the infrared-near infrared wavelength region are changed slightly, due to the difference in pH between the biogenic organism and the molecules. Therefore, the information of the environment of the biogenic organism where the molecules exist can be obtained.

The use of the infrared light or the near infrared light enables almost the same information as that of a conventional fluorescent microscope to be obtained without the dye of a sample such as the biogenic organism with the fluorescent dye molecules. As mentioned above, the vibration absorption spectrum of a given chemical group is sensitive to the surrounding environment, and thus, is changed in structure. In view of the above-mentioned property of the vibration absorption spectrum, the use of the infrared light or the near infrared light enables the existence condition of the substance as well as the material structure of the substance to be clarified. Therefore, the combination of the excellent analysis performance due to the use of the infrared light or the near infrared light and the (infrared) double-resonance absorption process enables the spatial resolution of the microscope to be developed.

FIG. 8 is a conceptual view of an infrared double-resonance absorption process on which the present invention is conceived. In FIG. 8, a molecule at the ground state (S0) is excited to a given higher energy level vibration-rotation state (S0(V1)) by an infrared light or a near infrared light (pumping light) of a first wavelength, and then, excited to a given vibration-rotation state (vibration-rotation resonance absorption) belonging to a first electron excited state (S1) from the excited state (S0(V1) by a light of a second wavelength (probe light). Here, a visible light or a ultraviolet light is employed as the probe light.

FIG. 9 shows a de-excitation process after the infrared double resonance absorption process. As shown in FIG. 9, in one case, the molecule at the vibration-rotation state belonging to the excited state (S1) is thermally relaxed to the lowest energy level vibration-rotation state belonging to the same state (S1), and then, de-excited to a given vibration-rotation state belonging to the ground state (S0) by the fluorescence emission of a third wavelength. Thereafter, the molecule is thermally relaxed to the inherent ground state (S0). In another case, the molecule is photo-chemically changed at the excited state (S1), and thus, side-products such as another chemical substance, ions or electrons may be created.

In the infrared double resonance absorption process, since the vibration-rotation resonance absorption is required to the infrared light or the near infrared light employed at minimum, various responses detected through the infrared double resonance absorption process becomes almost equal to the infrared or the near infrared absorption spectrum.

Therefore, the infrared double resonance absorption process is characterized by the high detection sensitivity. For example, in an infrared or a near infrared spectroscopy, an absorption spectrum within an infrared or a near infrared wavelength region is measured, but the change in intensity of the absorption spectrum can not be detected precisely if the absorption degree is small due to the intensity fluctuation of a light source. On the contrary, in the infrared double resonance absorption process, since the side-products are created only by irradiating the pumping light and the probe light into a sample, various phenomena can be easily detected. This process is called as a "zero-level detection", which is employed in a field of fluorescent microscope, photoelectron microscope or fluorescent X-ray analysis. Moreover, the sensitivity of the detection process using the infrared double resonance absorption is very high.

Various interesting phenomena are expected for the infrared double resonance absorption process in imaging. FIGS. 10(a) and (b) shows the state where a molecule in a sample to be observed is detected by using the infrared double resonance absorption process. FIG. 10(a) shows the state where a pumping light composed of an infrared light or a near infrared light and a probe light composed of a visible light or an ultraviolet light are partially and spatially overlapped and focused onto the sample, and FIG. 10(b) shows the overlapping degree of the pumping light and the probe light in the focusing region.

In the infrared double resonance absorption process, the optical response peculiar to the infrared double resonance absorption can be observed only by irradiating the pumping light and the probe light simultaneously. As shown in FIG. 10, therefore, in the case that the pumping light and the probe light are focused on the sample with overlapped partially and spatially, only the optical response of the molecules existing in the overlapped region can be observed. This phenomenon is very important in spatial measurement.

For example, a laser scanning microscope as shown in FIG. 11 may be exemplified as a conventional microscope. In the laser scanning microscope, a laser beam from a laser source 51 is focused onto a sample 55 to be observed which is placed on a stage via a reflecting mirror 52, a beam splitter 53 and an objective lens 54. Then, the focused laser beam is scanned on the sample 55 through the relative movement of the focused laser beam for the sample. Then, the optical response signal (e.g., fluorescent signal) from the sample 55 due to the irradiation of the focused laser beam is split at the beam splitter 53 from the approach route via the objective lens 54, and then, received at an optical detector 59 via a filter 56, a linkup lens 57 and a pinhole 58 and imaged at a computer.

Generally, the spatial resolution of such a kind of microscope is determined on the beam size of the focused laser beam. Concretely, the spatial resolution is determined on the diffraction limit defined by the focusing optical system and the wavelength of the laser beam, and can not be developed beyond the diffraction limit.

Whereas, employing the phenomenon as shown in FIG. 10, since the optical response is composed of the focused laser beam, as a result, the sample can be observed in higher resolution than the diffraction limit, and thus, a desired super resolution microscope can be realized. It is innovative that the super resolution microscope has a high spatial resolution and an analysis performance peculiar to the infrared double resonance absorption process, and can exhibit a best performance among optical microscopes. In addition, the excitation corresponding to the summation of the photon energies of the pumping light and the probe light can be realized due to the infrared double resonance absorption process. For example, at least energy of 4 eV, which corresponds to an ultraviolet beam of wavelength of 300 nm or below in the conversion of wavelength, is required in tylosin, triptophan or nucleic acid as a biogenic amino acid molecule in order to be excited to the state (S1) from the state (S0)

As of now, however, a laser source for commercial use not expensive to emit a light beam of wavelength of 300 nm is not available. Moreover, the glass material to construct the focusing optical system usable within the ultraviolet wavelength region is very expensive, so that the total system including the super resolution microscope is expensive in cost. In addition, in the case of observing a biogenic organism, the ultraviolet beam can not be employed because it may damage the organism and then, the living observation for the organism, which is desired by a bio-searcher, can not be realized. On the contrary, in the infrared double resonance absorption process, by employing a vibration state around the wavelength of 900 nm of —CH group (1.4 eV in the conversion of photon energy), which is disclosed in "Spectroscopic method with in a near infrared wavelength region" and setting the wavelength of the probe light to 475 nm (2.6 eV in the conversion of photon energy), the fluorescence emitted at the transition between the state (S1) and (S0) after the infrared double resonance absorption process can be observed.

In this case, since the wavelength of the probe light is longer, the damage in the sample to be observed can be alleviated, and various laser source commercially available may be employed. For example, an Ar laser (476.5 nm) may be employed as the prove light having the wavelength of 475 nm, and an AlGaAs-based semiconductor laser commercially available, which is not expensive and high reliable, may be employed as the pumping light having the wavelength of 900 nm.

In the super resolution microscope using the infrared double resonance absorption process, the spatial overlap of the pumping light and the probe light to enhance the spatial resolution may be performed on the focusing method as shown in FIG. 10 where the pumping light and the probe light are shifted spatially and overlapped. Moreover, the spatial overlap may be performed on an intensity-modulation overlapping method where at least one of the pumping light and the probe light is modulated in intensity. For example, as shown in FIGS. 12(a)–(c), the pumping light and the probe light are divided into three beam region relating to their respective phase modes, and then, the divided beam regions may be overlapped partially.

In FIG. 12(a), the pumping light and the probe light are divided into three beam regions on the sample where the adjacent regions are shifted in phase by $\pi$ and thus, modulated in intensity. If the pumping light and the probe light are focused below the diffraction limits, the outline size of the beam region pattern is determined on the diffraction limit and the beam region pattern is composed of three beam regions, as shown in FIG. 12(b). Because the adjacent beam regions between the beam region patterns of the pumping light and the probe light are reversed in phase and thus, the electrical field intensities in the adjacent beam regions are cancelled at the boundaries. As shown in FIG. 12(c), therefore, if the beam regions relating to spatial modes of the pumping light and the probe light are partially overlapped, the response spatial region for the infrared double resonance absorption process is narrowed one-third as large as the beam region pattern. As a result, the spatial resolution can be enhanced three times.

Various overlapping method for the beam region patterns of the pumping light and the probe light can be considered. As shown in FIGS. 13(a)–(c), for example, the pumping light and the probe light are divided into two regions relating their respective phase modes on the sample, and then, partially overlapped on the sample. In this case, the spatial resolution can be enhanced two times laterally on the sample. Moreover, as shown in FIGS. 14(a)–(c), the two divided beam regions of the pumping light and the probe light are spatially overlapped on the sample longitudinally and laterally, and thus, the spatial resolution can be enhanced longitudinally and laterally. In this case, the two divided beam regions are partially and laterally overlapped in the same manner as shown in FIG. 13, and also, partially and longitudinally shifted each other, to restrict the overlapping region. For example, longitudinal half pitch shift enables the spatial resolution to be enhanced two times.

The optical detector may detect the difference between the luminance detected from the sample when the first light and the second light are irradiated onto the sample so as to be partially overlapped on the sample and the luminance detected from the sample when only the second light is irradiated onto the sample.

The first light source and the second light source may be pulsed light sources having the same pulse frequency, and the pulse width of the second light from the second light source may be set larger than that of the first light from the first light source.

The first light source and the second light source may be pulsed light sources having the same pulse frequency, and the pulse frequency of the second light source may be set to be an integral number multiple of that of the first light source so that the first light source and the second light source oscillate simultaneously.

A background luminance may be detected by scanning the second light on the sample and detecting a luminance or a scattered light from the sample, and a signal luminance may be detected by scanning the first light and the second light simultaneously on the sample and detecting from the sample, and the signal luminance may be subtracted by the background luminance, to obtain the inherent signal luminance.

In a conventional super resolution microscope, a pulsed pumping light and a pulsed erasing light are irradiated onto a sample to be observed almost simultaneously, as shown in FIG. 15. Moreover, in the case that the pulsed widths of the pumping light and the erasing light are shorter than the fluorescence life duration of a fluorescence labeler molecule, the pumping light and the erasing light are irradiated so that the timing of the irradiation of the erasing light is slightly delayed from that of the pumping light, as shown in FIG. 16. In both cases, since the pumping light and the erasing light are irradiated onto the sample within a short period of time, a background signal is superimposed to the inherent signal relating to the image of the sample to be observed if side-optical response signal is generated by the irradiation of the erasing light.

In a concrete embodiment accompanying to the preferred embodiment, separated from the irradiation of the erasing light with the pumping light to observe the inherent image, the erasing light is irradiated within a period of time not relating to the inherent observation of image and thus, the background signal is measured. Then, the detected optical response signal is detracted by the measured background signal, to obtain the inherent image signal.

The above-mentioned process will be explained, with reference to FIGS. 17 and 18. In FIG. 17, the luminance pulse frequency of the erasing light is set equal to that of the pumping light, and the pulse width of the erasing light is set two times as large as that of the pumping light. In this case, the pumping light and the erasing light are focused onto and moved relatively on the sample. Then, a background signal at the divided period E of time in the pulse of the erasing light which is precedent in time and a signal at the divided period EP of time in the pulse of the erasing light which is behind in time are measured per one measuring point, and then, the difference (EP-E) is calculated. As a result, only the inherent image signal of super resolution can be detected.

In FIG. 18, the pulse frequency of the erasing light is set integral number times, for example twice as high as that of the pumping light. In this case, too, the pumping light and the erasing light are focused onto and moved relatively on the sample. Then, a background signal at the period T1 of time in the pulse of the erasing light when only the erasing light is irradiated and a signal at the period T2 of time in the pulse of the erasing light when the erasing light and the pumping light are irradiated simultaneously are measured per one measuring point, and then, the difference is calculated. As a result, only the inherent image signal of super resolution can be detected in the same manner as shown in FIG. 17.

Moreover, if a precise scanning mechanism is employed to move the focusing point relatively on the sample, at first, only the erasing light may be irradiated and scanned two-dimensionally on the region of the sample to be observed, and then, the erasing light and the pumping light may be irradiated and scanned simultaneously two-dimensionally, to obtain a given image signal per one measuring point. Then, the differential signal is calculated per one measuring point, to obtain only the inherent image signal of super resolution can be detected.

BRIEF DESCRIPTION OF THE DRAWINGS

For better understanding of the present invention, reference is made to the attached drawings, wherein FIG. 12a, FIG. 12b and FIG. 12c are views showing another state where a pumping light and an erasing light are irradiated simultaneously, FIG. 13a, FIG. 13b and FIG. 13c are views showing still another state where a pumping light and an erasing light are irradiated simultaneously, FIG. 14a, FIG. 14b and FIG. 14c are views showing a further state where a pumping light and an erasing light are irradiated simultaneously.

DESCRIPTION OF THE PREFERRED EMBODIMENTS

This invention will be described in detail hereinafter, with reference to the accompanying figures.

Figure 19:
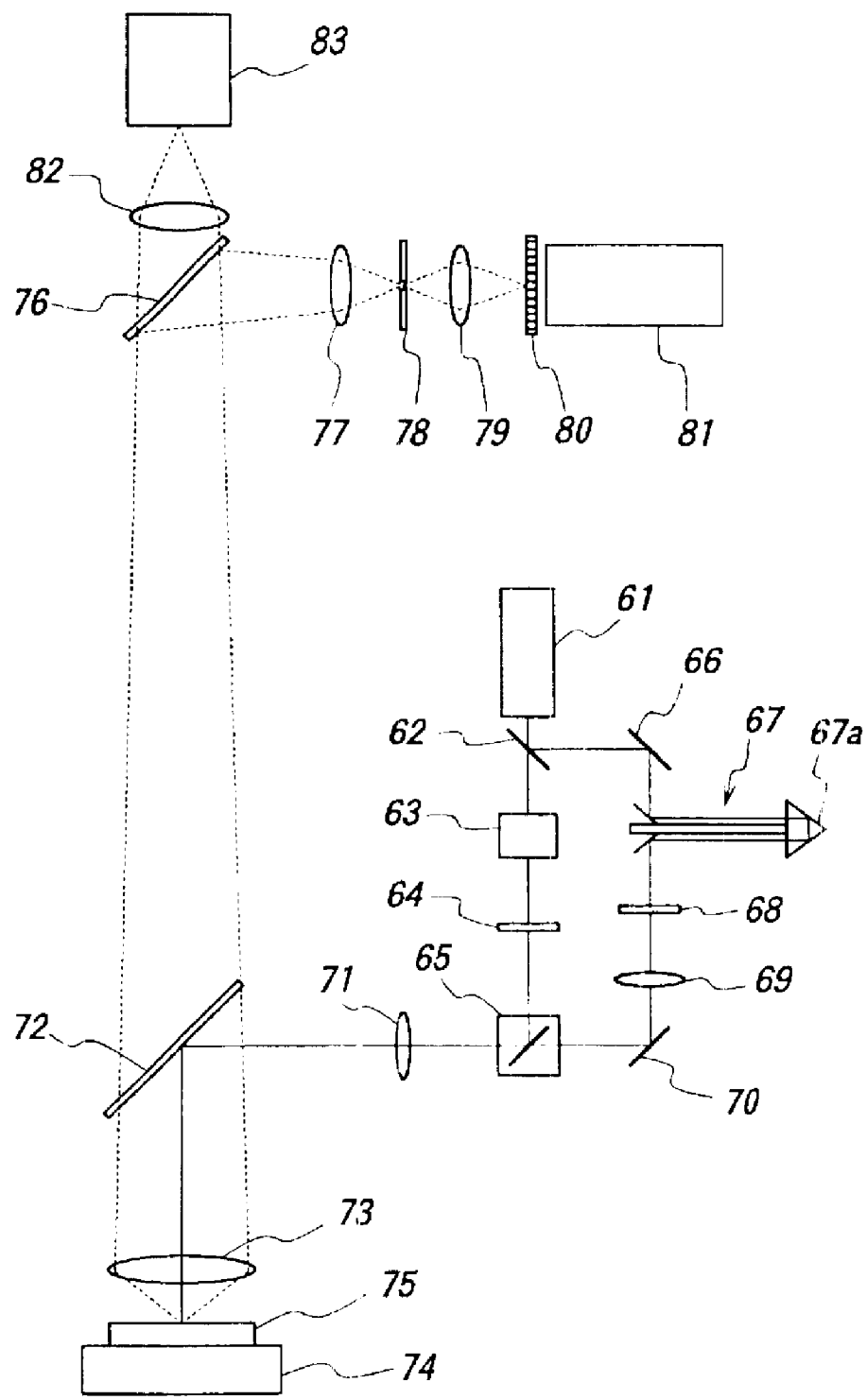
FIG. 19 is a structural view schematically showing a super resolution microscope using infrared double resonance absorption process in an embodiment of a microscope according to the present invention.

FIG. 19 is a structural view schematically showing a super resolution microscope using infrared double resonance absorption process in an embodiment of a microscope according to the present invention. In the super resolution microscope according to the present invention, a probe light and a pumping light are spatially modulated, to realize the super resolution. Therefore, a laser scanning type microscope of spatial high resolution can be realized. In this case, a fluorescent spectrum from a sample to be observed is observed per one laser shot and thus, the chemical structure and the composition of the sample can be analyzed. The concrete embodiment will be described hereinafter, with reference to FIG. 19.

In this embodiment, a titanium-sapphire laser device 61 is employed as a pulsed optical source, and then, methylene groups of —$CH_2$ bonded to a benzene ring are observed by a pumping light (first light) and a probe light (second light) generated from a pulsed laser beam from the laser device 61. As described in "Spectroscopic method with in a near infrared wavelength region", it is confirmed that the absorption of —$CH_2$ group due to the vibration excitation occurs within a wavelength region of 885–895 nm, which is belonged to the tuning wavelength region of 780–920 nm in the titanium sapphire laser device 51 (referring to "Product guide" published by "Spectra Physics Ltd.).

Although the absorption line of the —$CH_2$ group due to the vibration excitation is slightly changed on the environmental atmosphere of the sample including the —$CH_2$ group, the resonance absorption can be satisfied if the oscillation wavelength of the titanium sapphire laser device 61 is adjusted appropriately. Also, if the laser beam from the titanium sapphire laser device 61 is introduced in a non-linear optical crystal such as BBO, it can be converted into a laser beam having the double wave of 390–460 nm. The converted laser beam corresponds to a photon energy within 2.7–3.2 eV, and thus, the transition excitation between a higher energy level excited state belonging to the state (S0) and a given vibration state belonging to the state (S1) can be realized in the benzene-ring. Moreover, it is confirmed that the benzene-ring is not excited to the state (S1) from the ground state by a laser beam having a wavelength within 390–460 nm, and thus, no optical response can be detected. Therefore, in this embodiment, the light of the fundamental harmonics from the titanium sapphire laser device 51 is employed as a pumping light and the light of the second harmonics from the titanium sapphire laser device 51 is employed as a probe light.

In FIG. 19, the laser beam (of fundamental wave) emitted from the titanium sapphire laser device 61 is split into two laser beams by a beam splitter 62. One laser beam split is passed through a KDP crystal 63 and then, converted into the laser beam of the second harmonics, which are employed as the probe light. The probe light is passed through a phase plate 64 as a phase modulate filter, to be spatially modulated in intensity, and then, introduced into a dichroic mirror 65. The other laser beam split, which is employed as the pumping light, is introduced into a phase plate 68 as phase modulate filter via a mirror 66, a prism 67a movable horizontally, to be spatially modulated in intensity. Then, the pumping light is introduced into the dichroic mirror 65 via a lens 69 for position adjustment and a mirror 70, and then, combined with the probe light.

In this way, in this embodiment, a first optical source is composed of the titanium sapphire laser device 61, and a second optical source is composed of the titanium sapphire laser device 61 and the KDP crystal 63. The spatial overlapping degree between the pumping light and the probe light at the dichroic mirror 65 is adjusted finely by the lens 69.

The pumping light and the probe light which are combined at the dichroic mirror 65 are passed through a lens 71 and reflected at a half mirror 72, and then, focused on a sample to be observed on a two-dimensionally movable stage 74.

A fluorescence, which is emitted from the sample 75 by the irradiation of the pumping light and the probe light, is introduced into and reflected at the half mirror 76 via the objective lens 73 and the half mirror 72. Then, the fluorescence is concentrated to the center of a pinhole 78 by a lens 77, and introduced into a trasmittive diffraction grating 80 in a spectrum meter through a lens 79. Then, the fluorescence is introduced into an ICCD 81 camera of high sensitivity using photoelectron conversion principle. Herein, the pinhole 78 functions as a phase modulate filter, and eliminates other optical component without the fluorescence from the sample 75 (e.g., fluorescence or the like originated from some of the optical elements employed in this embodiment, and thus, the S/N ratio of the fluorescence from the sample 75 can be developed.

This embodiment is particularly characterized by using the trasmittive diffraction grating 80 as a spectrum meter, which belongs to a detection system. Therefore, since the time response for the fluorescence spectrum and the laser irradiation as well as the detection of the fluorescence signal can be realized, the chemical structure and the composition of the sample can be analyzed.

The fluorescence from the sample 75 is passed through the half mirror 76, and focused on a CCD camera by a focusing lens 82. Therefore, the fluorescence can be observed in spot-like image at the CCD camera. In this condition, the pumping light and the probe light are focused on the sample 75 by appropriately adjusting the objective lens 73.

In order to realize the super resolution effectively, in this embodiment, it is required that the pumping light and the probe light are overlapped spatially and in time. Since the titanium sapphire laser device 61 is employed as a pulsed light source, the overlapping in time is realized by moving a prism 67a of a delay optical system 67 horizontally to control the optical paths of the pulsed pumping light and the pulsed probe light so that the pulsed pumping light and the pulsed probe light are irradiated on the sample simultaneously in time. The optical paths can be controlled by detecting laser scattered lights from the sample at a PIN photo diode with high speed response and then, monitoring the thus obtained output signal at a sampling oscilloscope.

Figure 1:
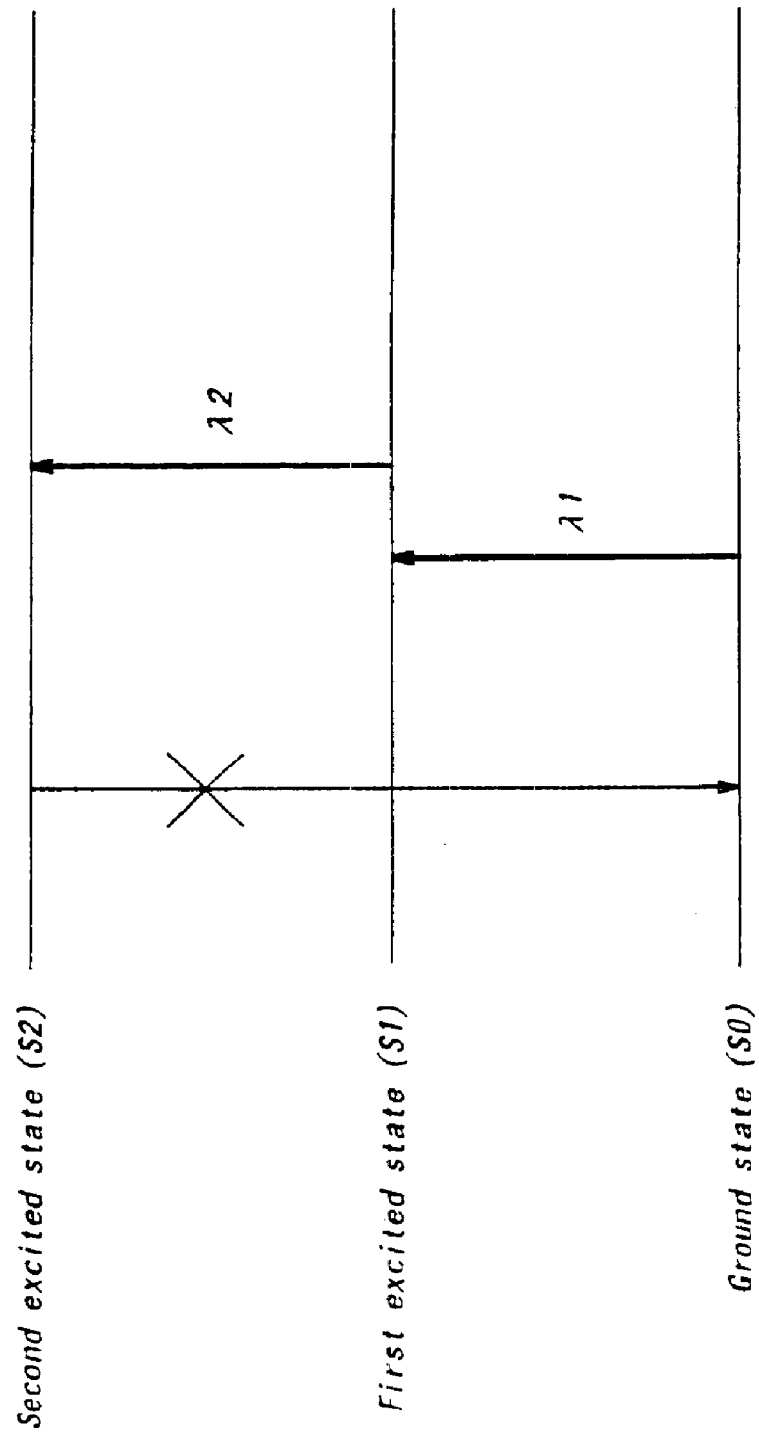
FIG. 1 is a conceptual view showing the process of double-resonance absorption.
Figure 2:
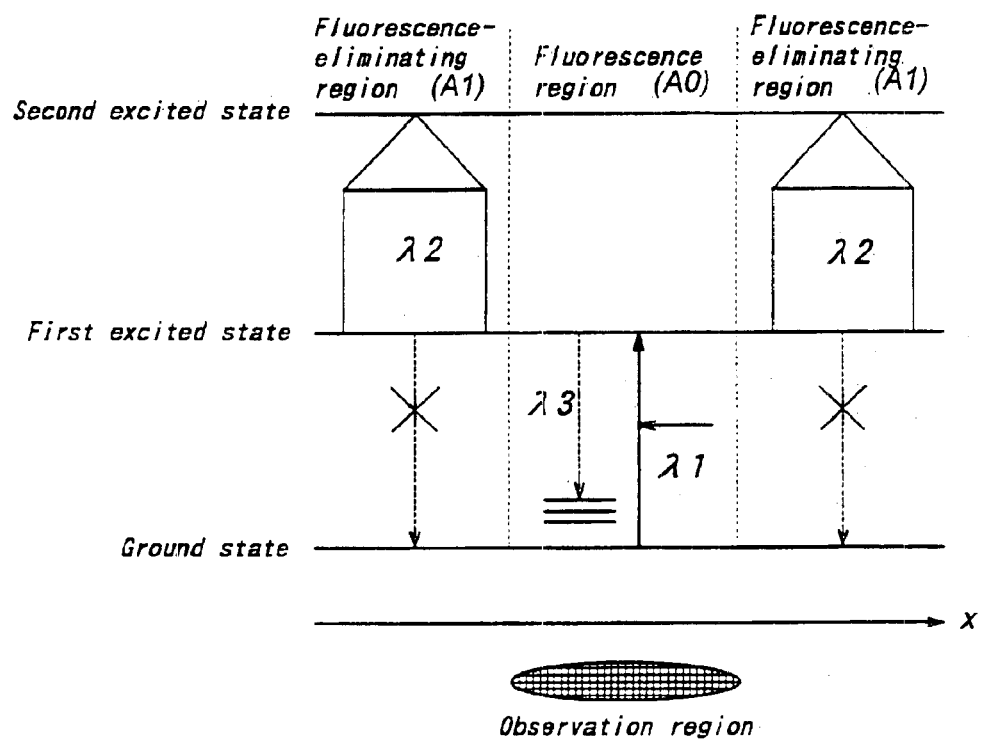
FIG. 2 is also a conceptual view showing the process of double-resonance absorption.
Figure 3:
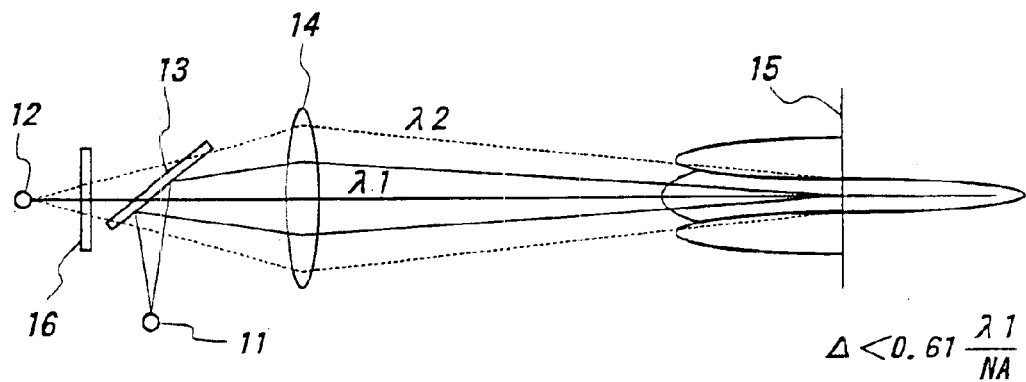
FIG. 3 is a structural view of a conventional super resolution microscope.
Figure 4:
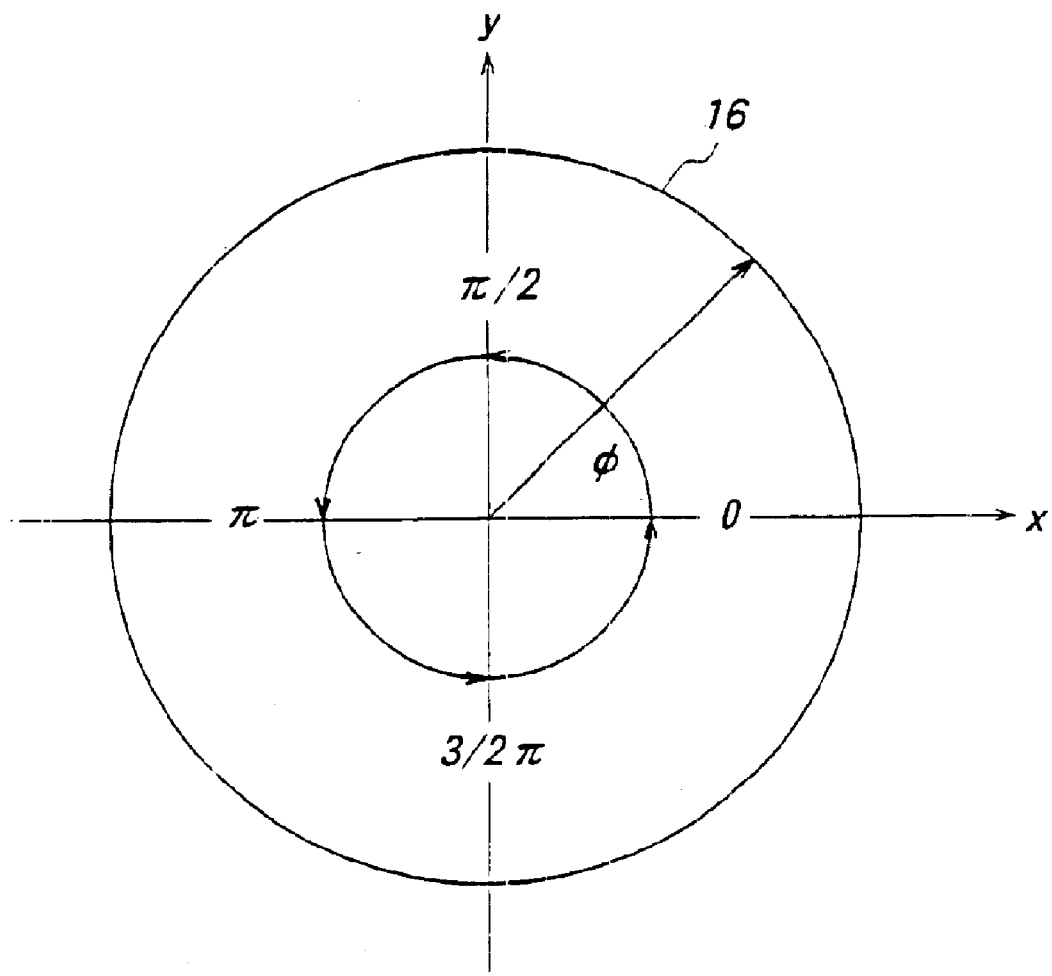
FIG. 4 is a plan view showing the structure of the phase plate shown in FIG. 3.
Figure 5:
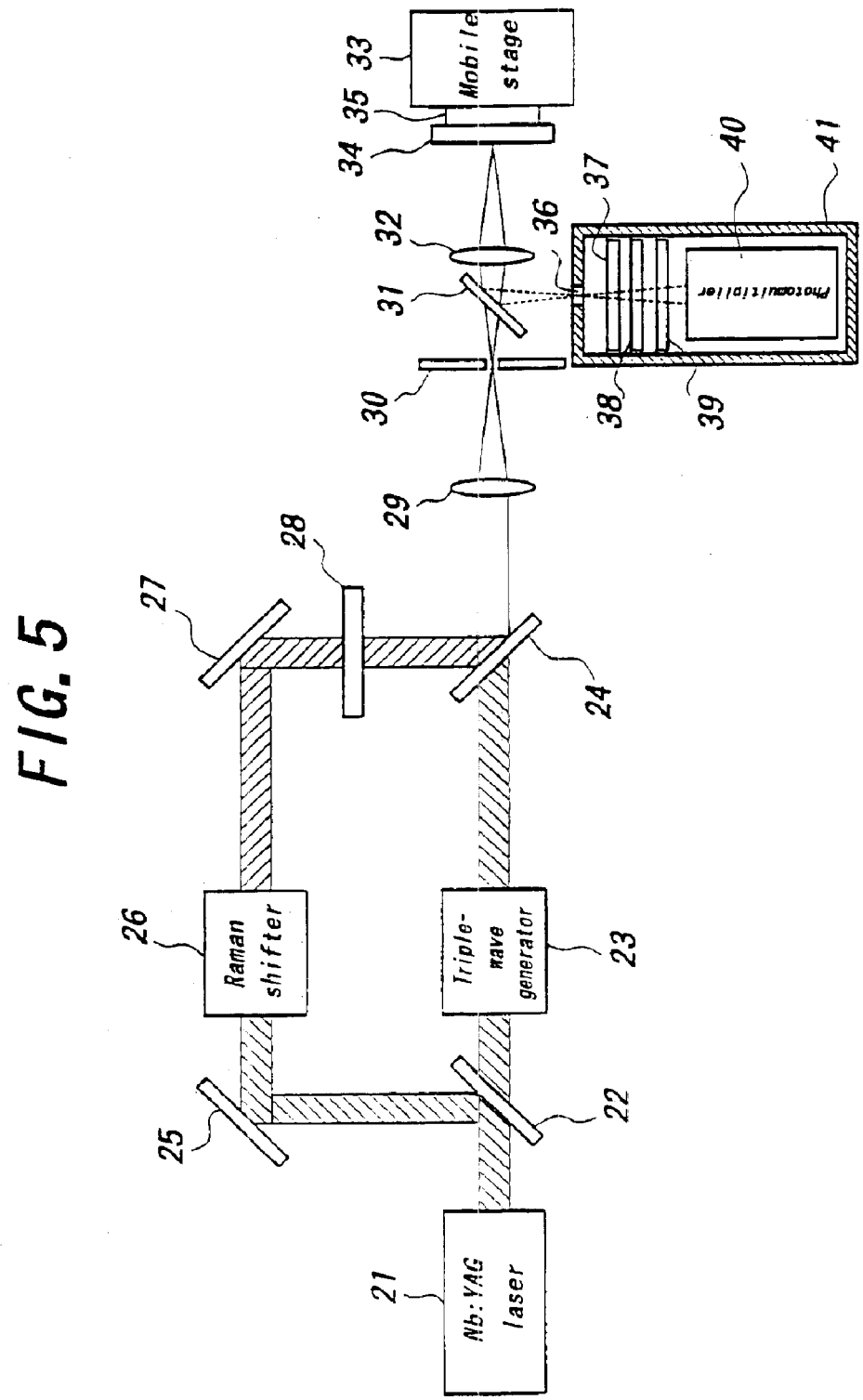
FIG. 5 is another structural view of a conventional super resolution microscope.
Figure 6:
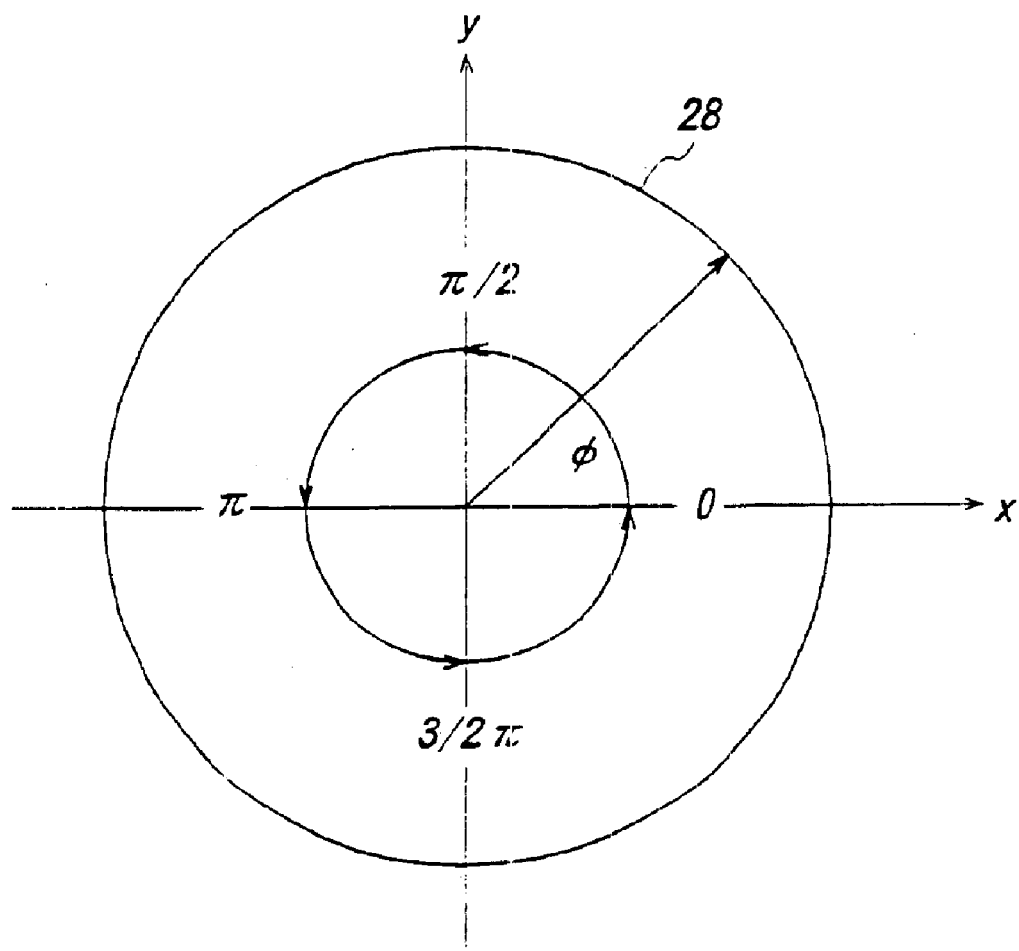
FIG. 6 is a plan view showing the structure of the phase plate shown in FIG. 5.
Figure 7:
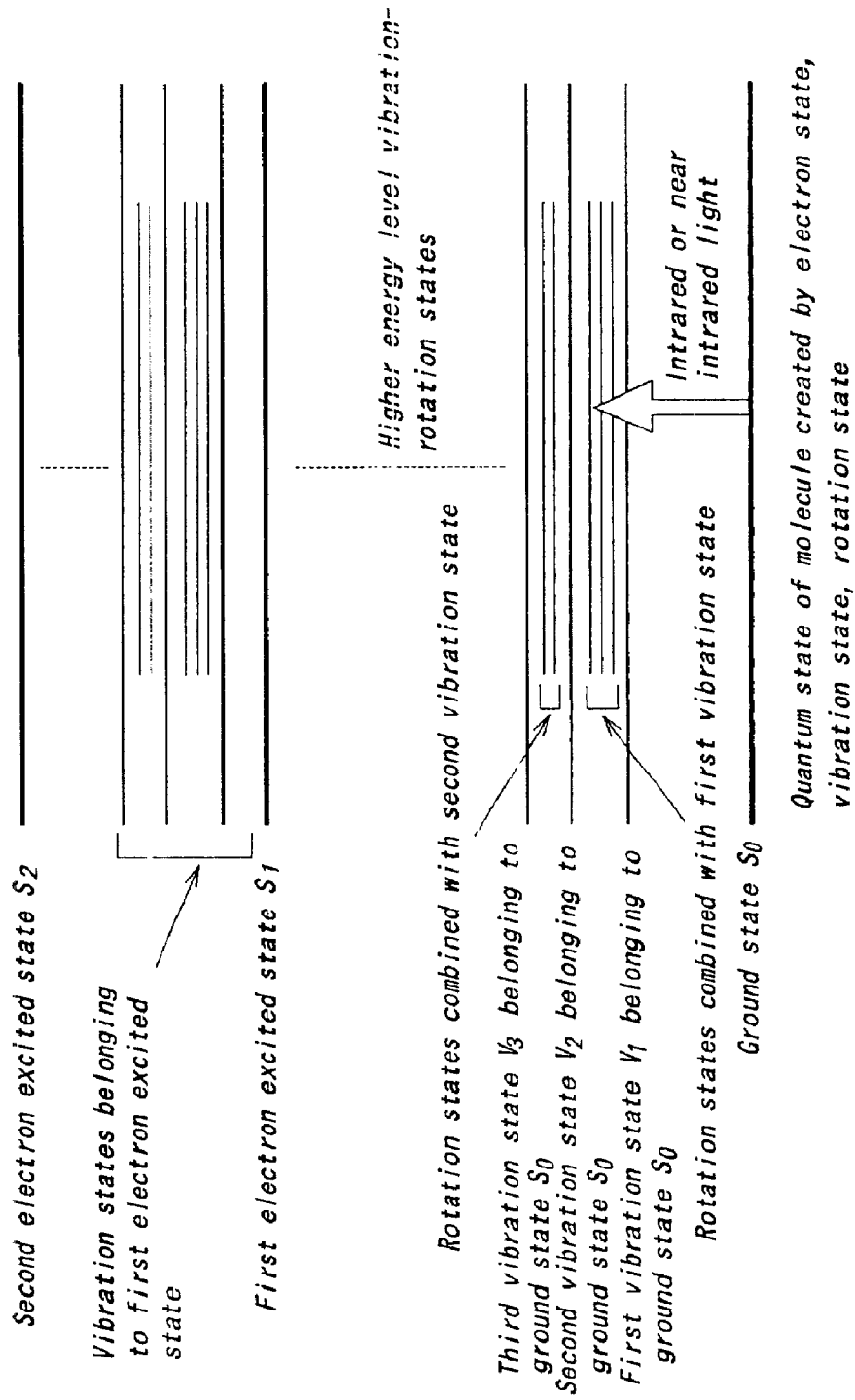
FIG. 7 is an explanatory view of a microscope according to the present invention.
Figure 8:
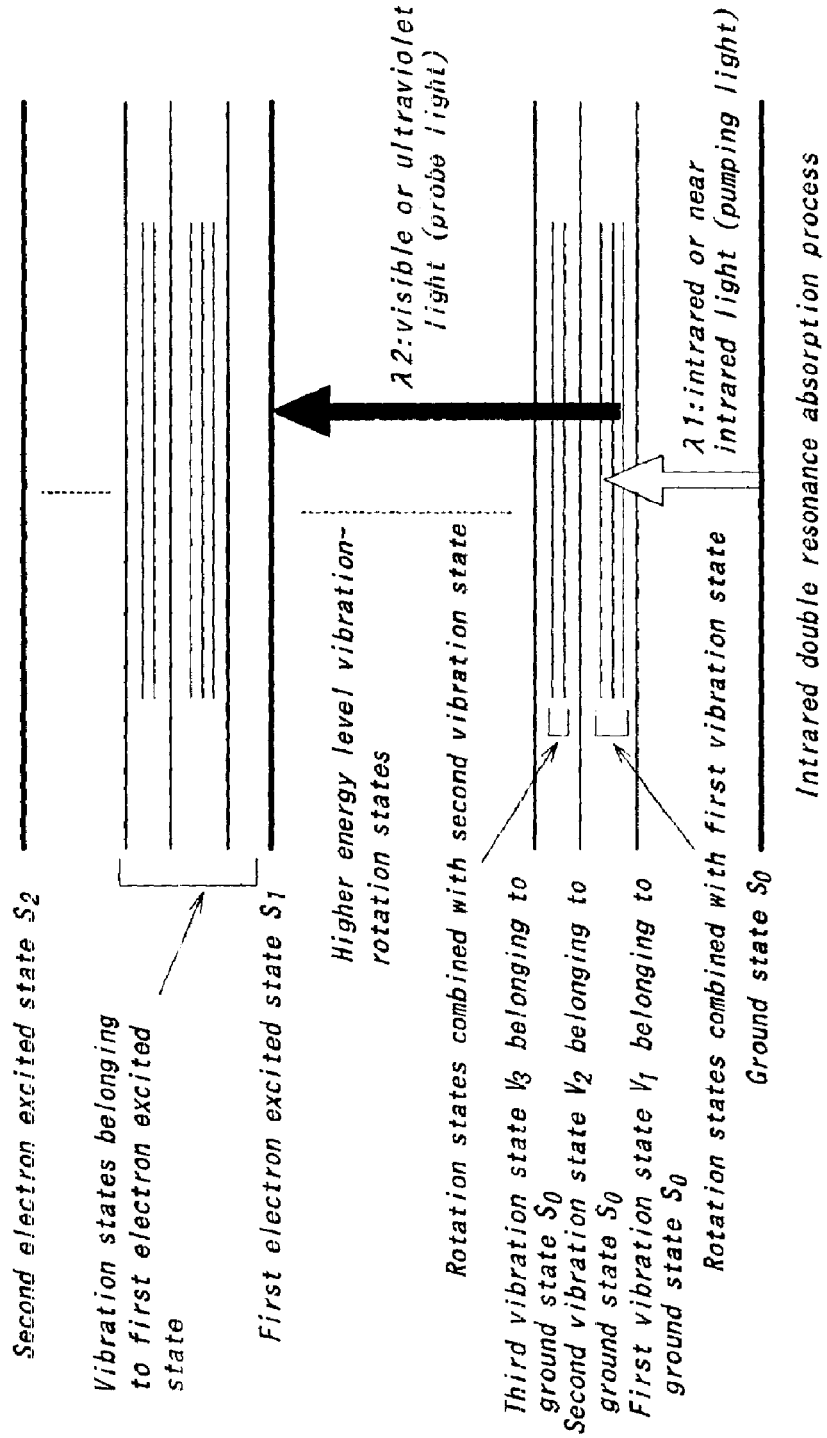
FIG. 8 is another explanatory view of a microscope according to the present invention.
Figure 9:
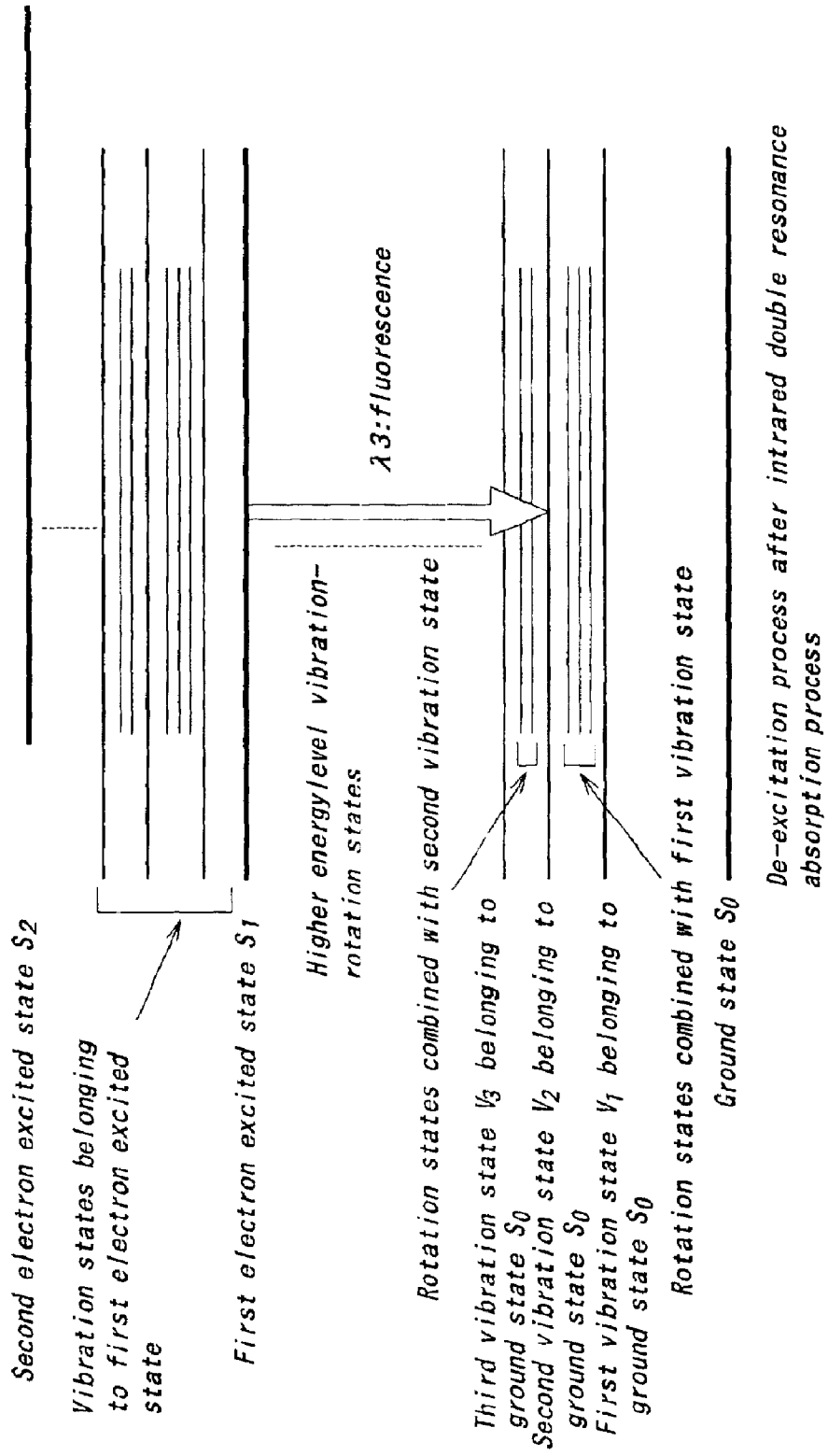
FIG. 9 is still another explanatory view of a microscope according to the present invention.
Figure 10A:
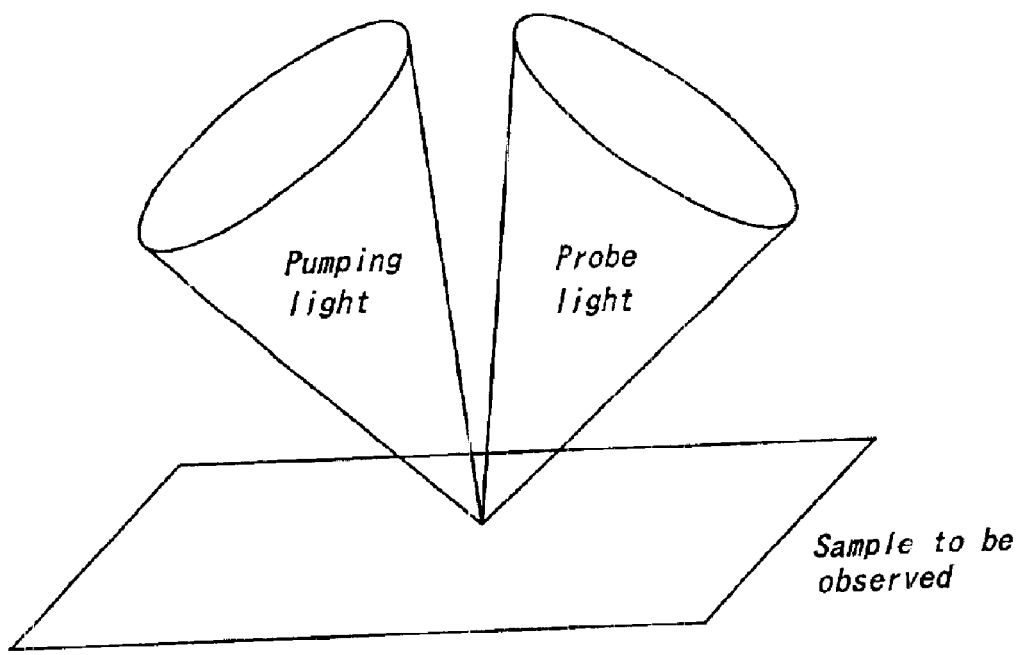
FIG. 10a and FIG. 10b are views showing a state where a pumping light and an erasing light are irradiated simultaneously.
Figure 10B:
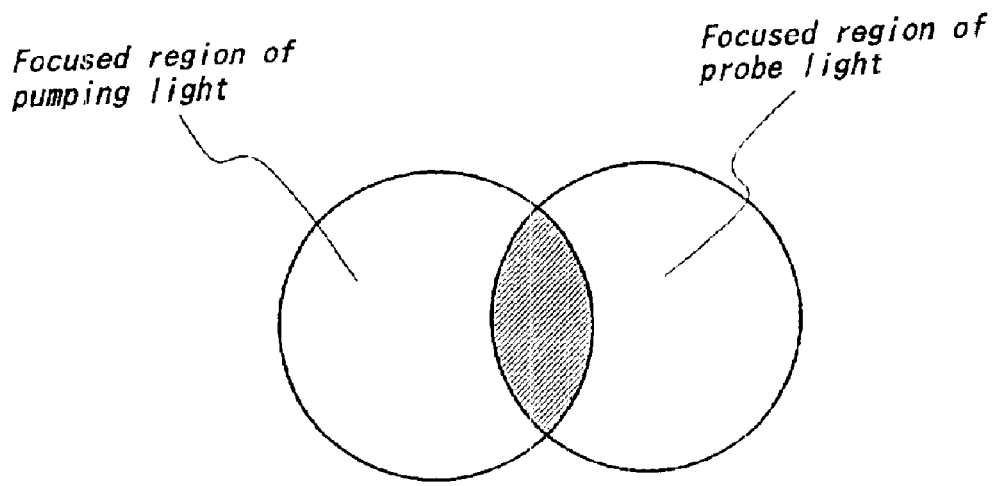
Figure 11:
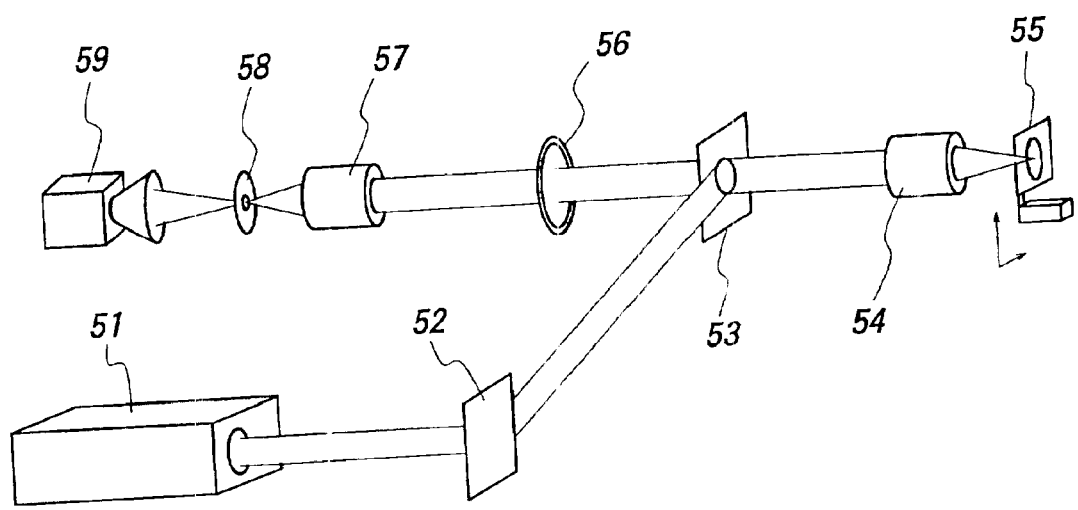
FIG. 11 is a structural view schematically showing a scanning laser microscope.
Figure 14C:
Figure 15:
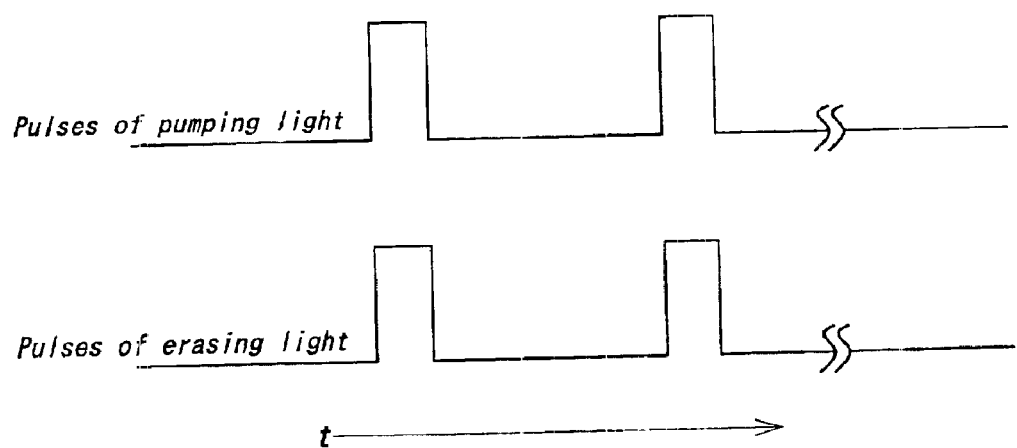
FIG. 15 is a view showing an emission timing between a pumping light and an erasing light in a conventional super resolution microscope.
Figure 16:
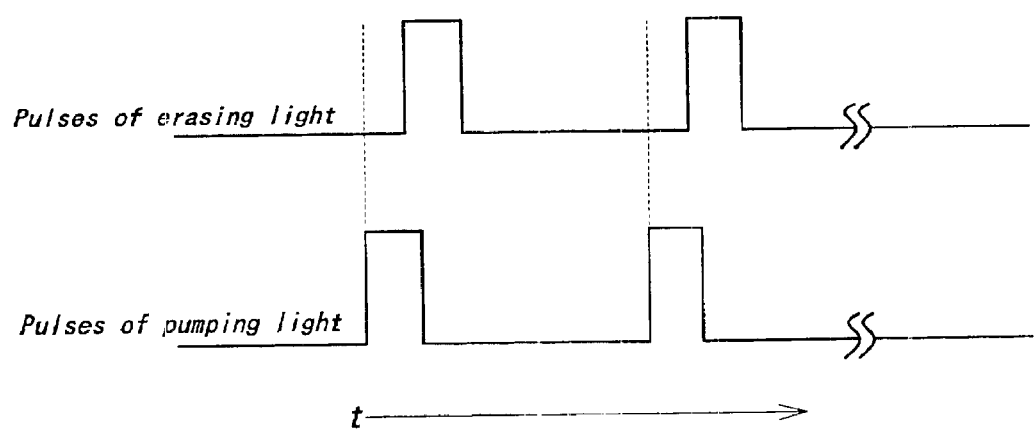
FIG. 16 is a view showing another emission timing between a pumping light and an erasing light in a conventional super resolution microscope.
Figure 17:
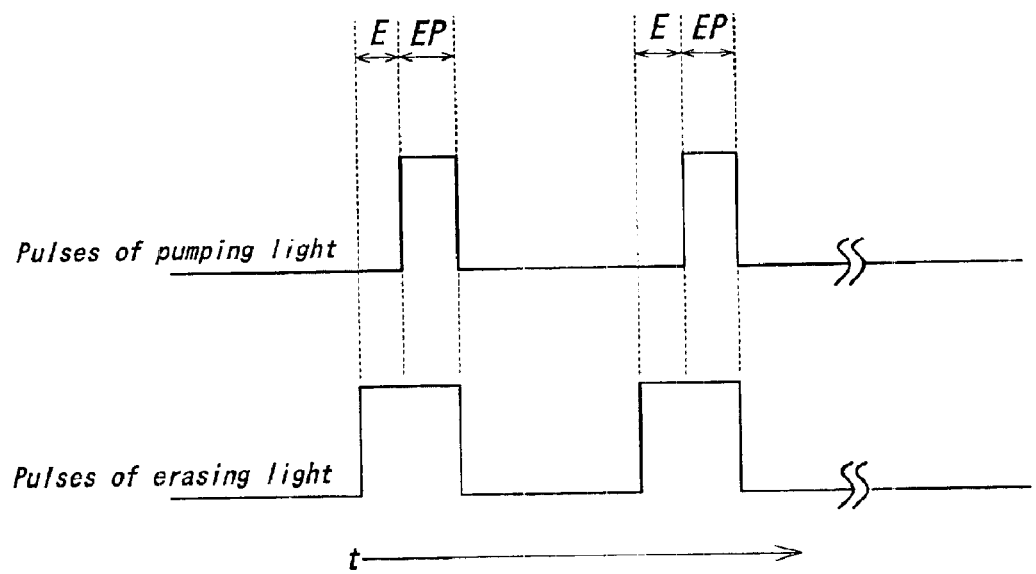
FIG. 17 is an explanatory view of the principle in a preferred embodiment of a microscope according to the present invention.
Figure 18:
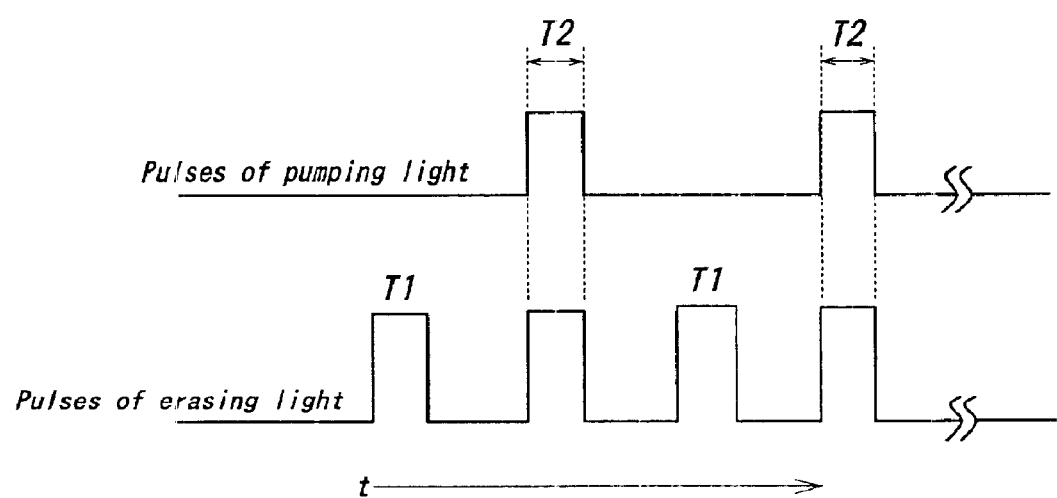
FIG. 18 is another explanatory view of the principle in a preferred embodiment of a microscope according to the present invention.

The spatial overlapping is realized by the overlapping method as shown in FIG. 14. That is, the pumping light and the probe light are divided into two beam regions relating to their modes, respectively, by phase plates 68 and 64, and thus, spatially modulated in intensity.

Figure 20A:
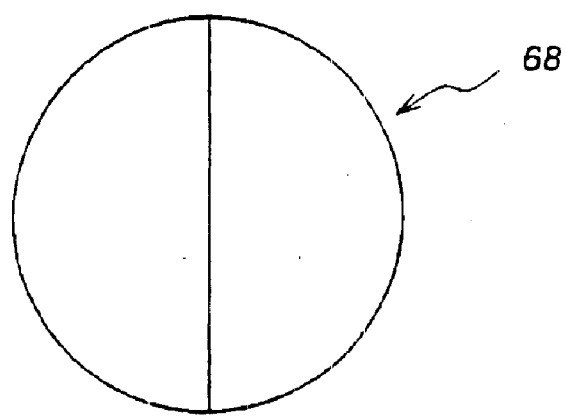
FIG. 20a, FIG. 20b and FIG. 20c are views showing a structure of the phase plate for the pumping light shown in FIG. 19 and a spatial mode pattern of the pumping light.
Figure 20B:
Figure 20C:
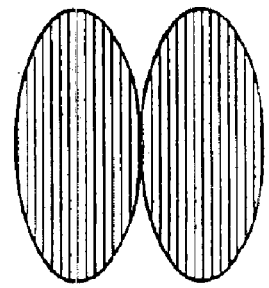
Figure 21A:
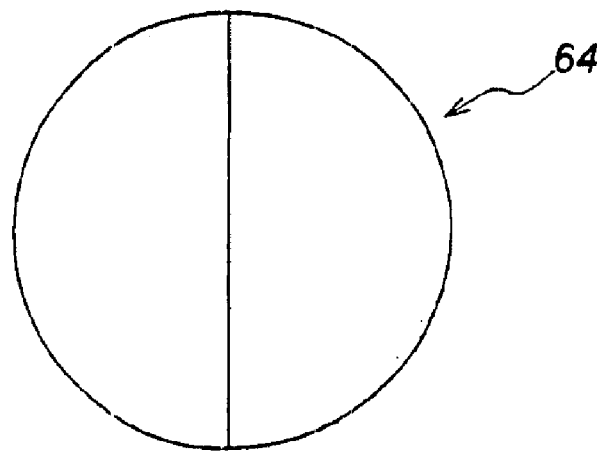
FIG. 21a, FIG. 21b and FIG. 21c are views showing another structure of the phase plate for the pumping light shown in FIG. 19 and another spatial mode pattern of the pumping light.
Figure 21B:
Figure 21C:
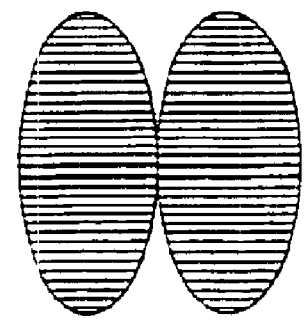

Therefore, the phase plate 68 is made in a manner as shown in FIGS. 20(a) and (b). That is, a quartz glass substrate to form the phase plate 68 is separated into two regions, and then, one region is chemically etched so that the phase of the pumping light is shifted by $\pi$. In this case, the mode pattern of the pumping light is created as shown in FIG. 20(c). The phase plate 64 is made in a manner as shown in FIGS. 21(a) and (b). That is, a quartz glass substrate to form the phase plate 64 is separated into two regions, and then, one region is chemically etched so that the phase of the pumping light is shifted by $\pi$. In this case, the mode pattern of the pumping light is created as shown in FIG. 21(c).

In this way, the pumping light and the probe light are spatially modulated in intensity, relating to the two beam mode regions, as shown in FIG. 14(a), and focused on the sample 75 by the lens 69 in FIG. 19 for position adjustment so that the two-dimensional resolution can be enhanced double, as shown in FIG. 14(b).

Although the present invention will be described in detail, with reference to the embodiment as mentioned above, the present invention is not limited to the above embodiment, and every kind of variation and modification may be made for the embodiment. For example, by employing the vibration excitation state of such a chemical group as —CH (triple harmonic tone: 900–910 nm), secondary amine of —NH (triple harmonic tone: 1010–1040 nm), or isolated —OH alcohol (triple harmonic tone: 730–745 nm), instead of the methylene group of —$CH_2$, the chemical composition of the sample can be imaged in high resolution. In addition, such a chemical group as C=C, C=O, —CHOH, or —CN may be employed, which are listed in "Spectroscopic method with in a near infrared wavelength region".

Although the titanium sapphire laser device is shared, and thus, the fundamental wave light is employed as the pumping light and the double wave light from the fundamental wave light by the KDP crystal 63 is employed as the probe light, a first light source for the pumping light and a second light source for the probe may be provided separatedly. In this case, it is desired that at least one of the first light source and the second light source is composed of a pulsed light source, particularly, of a wavelength-variable light source to obtain a given first wave light and a given second wave light, dependent on a chemical group to be observed in super resolution.

Next, a preferred embodiment of a microscope according to the present invention will be described.

Figure 22:
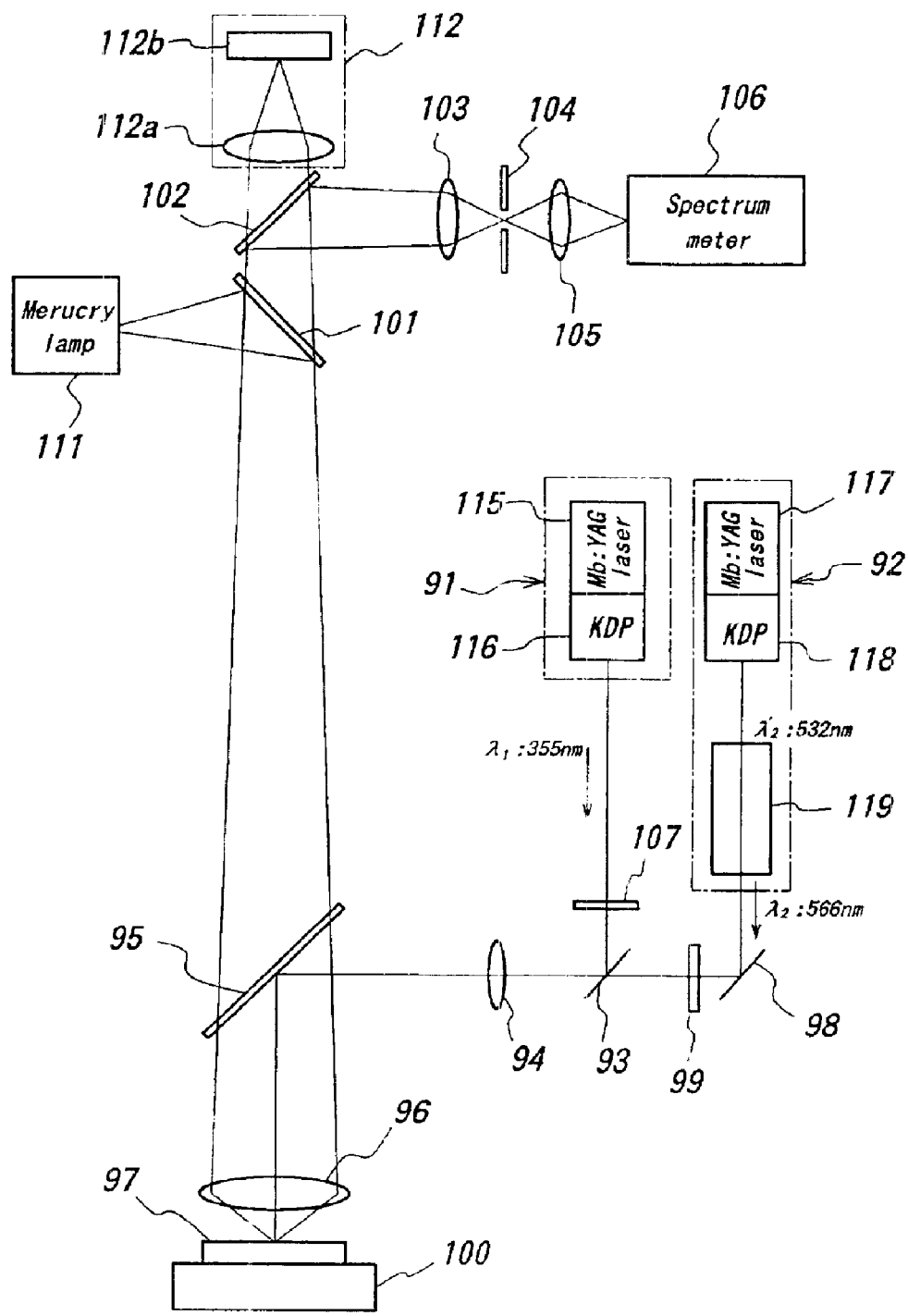
FIG. 22 is a structural view schematically showing a super resolution laser scanning type fluorescent microscope in one embodiment accompanying to a preferred embodiment according to the present invention.

FIG. 22 is a structural view schematically showing a super resolution laser scanning type fluorescent microscope in one embodiment accompanying to a preferred embodiment according to the present invention. The microscope depicted in FIG. 22 includes a laser device 91 for pumping light to oscillate a pumping light having a wavelength of $\lambda 1$ in pulse mode of the order of picosecond and a laser device 92 for erasing light to oscillate a erasing light having a wavelength of $\lambda 2$ in pulse mode of the order of picosecond.

The pumping light from the laser device 91 is reflected at a dichoic mirror 93 and then, reflected at a half mirror 95 via a relay lens 94, and then, focused on a sample 97 dyed by fluorescent labeler molecules by an objective lens 96. The erasing light from the laser device 92 is reflected at a mirror 98 and then, passed through a phase plate 99 and the dichroic mirror 93, and then, focused on the sample 97 via the relay lens 94, the half mirror 95 and the objective lens 96 so that the optical axis of the erasing light is matched to that of the pumping light.

Figure 23:
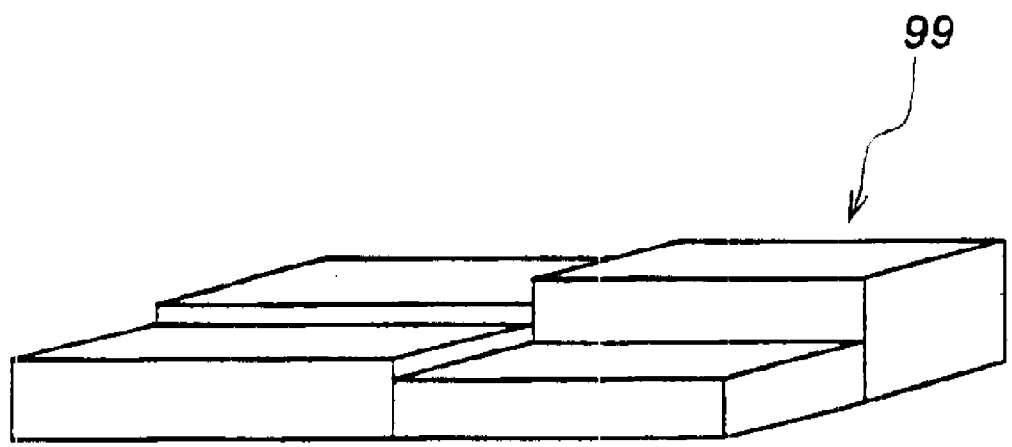
FIG. 23 is a perspective view showing the structure of the phase plate shown in FIG. 22.

The erasing light is turned into a hollow beam of which the electrical strength at around the center is zero by the phase plate 99. The phase plate 99 is made in a manner as shown in FIG. 23. That is, a glass substrate to form the phase plate 99 is chemically etched and divided into four regions so that the phase of the erasing light is shifted by ¼ wavelength per the one divided region. The phase plate is disposed in a given optical path, in order to obtain a super resolution microscope image using fluorescence repressing process.

The sample 97 is placed on a sample stage 100, and scanned two-dimensionally by the pumping light and the erasing light through the two dimensional movement of the sample stage 100.

A fluorescence from the sample is passed through the objective lens 96, the half mirrors 95 and a half mirror 101, and then, reflected at a half mirror 102, to be focused at the center of a pinhole 104 by a lens 103. Then, the fluorescence is introduced via a lens 105 into a spectrum meter which is composed of a high sensitive ICCD camera including a trasmittive diffraction grating and a photo-multiplier. Herein, the pinhole functions as a phase modulate filter, and eliminates other optical component, for example, other fluorescences from the optical elements employed in this embodiment without the fluorescence from the sample 97, so that the S/N ratio of the fluorescence as a optical response signal can be developed.

In this embodiment, a polarizer 107 may be disposed in the optical path of the pumping light between the laser device 91 and the dichroic mirror 93, as occasion demands. In this case, the polarized plane of the pumping light can be rotated appropriately, and thus, the spatial orientation of the sample can be analyzed.

In this embodiment, a mercury lamp 111 is provided, so that the super resolution laser scanning type fluorescent microscope may be employed as a normal fluorescent microscope. An illuminated light from the mercury lamp 111 is reflected at the half mirror 101, and passed through the half mirror 95, to be irradiated onto the sample 97 by the objective lens 96. Then, a fluorescence from the sample 97 is passed through the objective lens 96, the half mirrors 95, 101 and 102 in turn, and then, focused on a CCD camera 112 including a focusing lens 112a and a CCD imaging element 112b.

Figure 24:
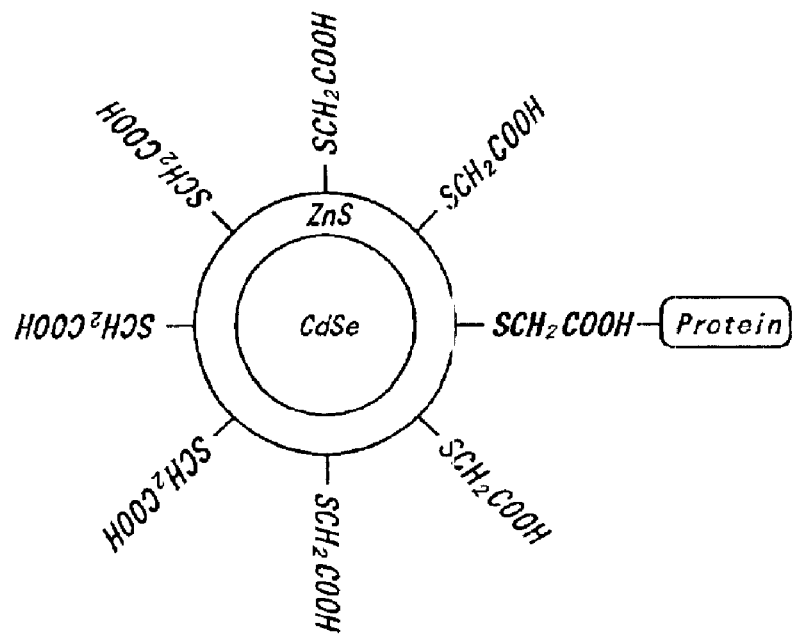
FIG. 24 is an explanatory view showing a fluorescent labeler molecule.
Figure 25:
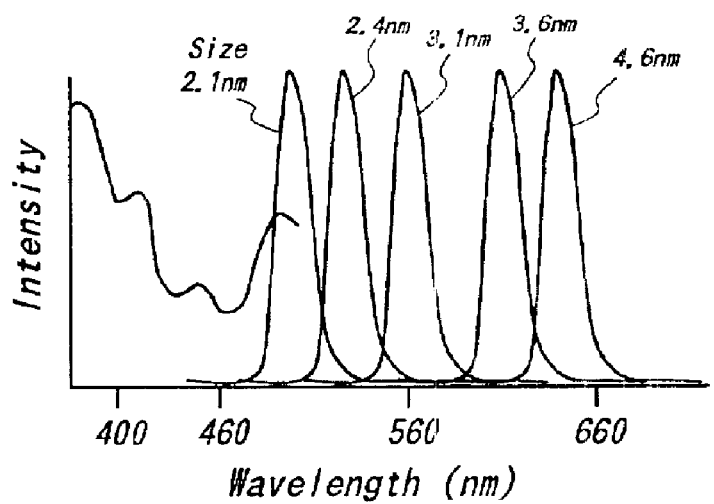
FIG. 25 is a view showing the optical property of the fluorescent labeler molecule shown in FIG. 24, FIG. 26a and FIG. 26b are views showing the electron structure of CdSe molecule to construct the fluorescent labeler molecule shown in FIG. 24.

Hereinafter, this embodiment will be described, on the condition that the sample 97 includes a fluorescent labeler which is composed of a quantum dot made of CdSe and a ZnS film provided on the quantum dots, as shown in FIG. 24. In the fluorescent labeler, the side chain of —SCH$_2$COOH elongates to the surface of the ZnS film, and may make thiol bond for a protein substance. According to recent data, the absorption of the CdSe quantum dot is observed strongly within a shorter wavelength region (around 350 nm) than 400 nm, as shown in FIG. 25, and thus, a valence electron of the CdSe quantum dot can be excited to a conduction band. As a result, a fluorescence from the quantum dot can be observed within a wide wavelength region of 500–660 nm, dependent on the size of the quantum dot.

Figure 26A:
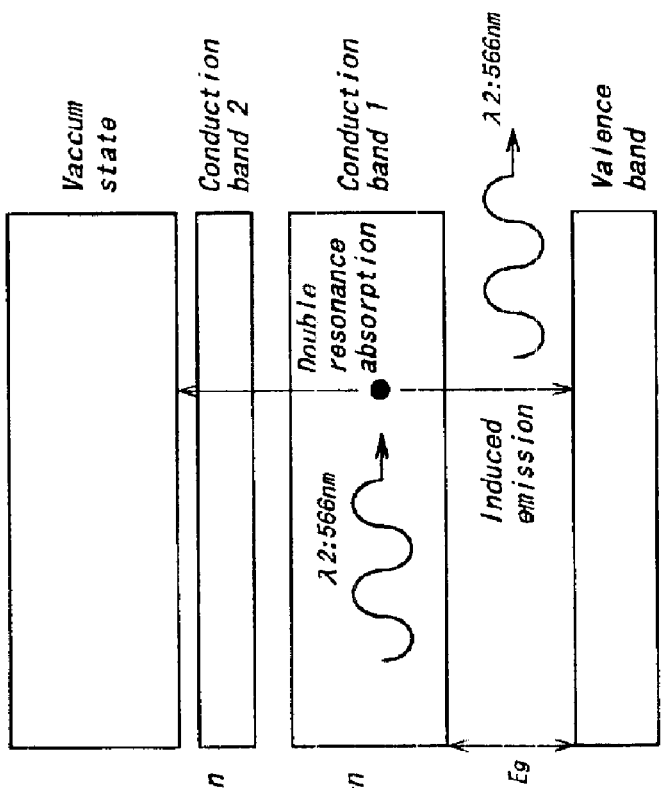
Figure 26B:
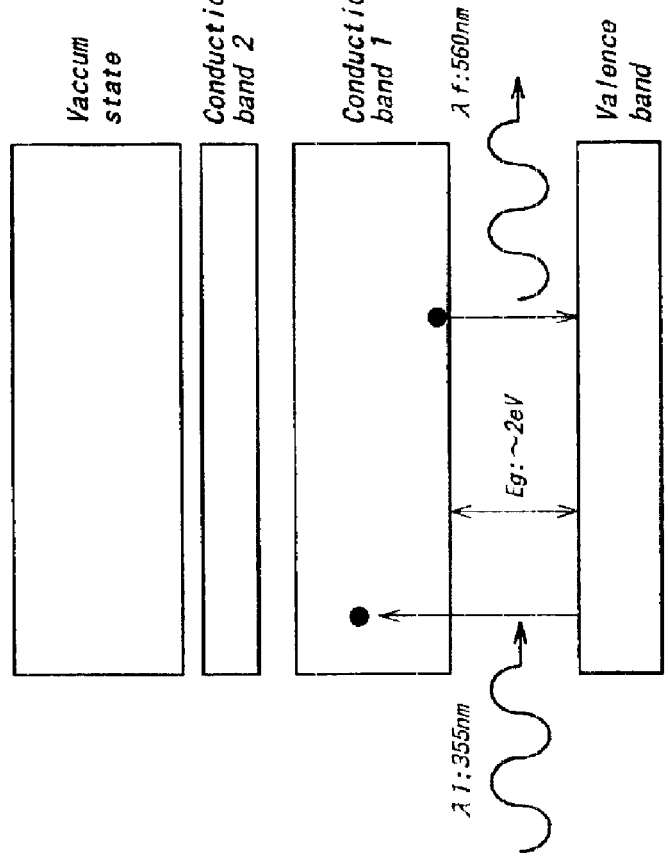

FIGS. 26(a) and (b) are views showing the electron structure of CdSe molecule (quantum dot) to construct the fluorescent labeler molecule shown in FIG. 24. As shown in FIG. 25, the maximum absorption of the CdSe molecule occur around a wavelength of 350 nm. Also, the band gap Eg of the CdSe molecule is about 2 eV, so that a fluorescence of strong intensity is emitted around a wavelength of 560 nm if the size of the CdSe quantum dot is set to 3.1 nm. In this case, therefore, if the sample is excited by the irradiation of a light having the wavelength of 355 nm ($\lambda$1), and a light having a wavelength of 566 nm slightly shifted from the wavelength of 560 nm ($\lambda$2) corresponding to the fluorescent emission center of the CdSe quantum dot is irradiated on the sample, other optical components having their wavelengths without the wavelength $\lambda$2 are eliminated through induced emission or double resonance absorption process.

In this embodiment, the sample, which dyed by the fluorescent labeler composed of the CdSe quantum dot having the size of 3.1 nm, is observed in super resolution by using the pumping light having the wavelength of 355 nm and the erasing light having the wavelength of 566 nm.

In this embodiment, therefore, a Nd:YAG laser device 115 to oscillate in pulse mode of picosecond order and a wavelength converting element 116 made of KDP crystal are provided, in addition to the laser 91. A laser beam (fundamental wavelength: 1064 nm) from the Nd:YAG laser device 115 is converted in wavelength into the third harmonics light beam (wavelength $\lambda$1:355 nm) at the wavelength converting element 116. The third harmonics light beam is employed as the pumping light.

Also, a Nd:YAG laser device 117 to oscillate in pulse mode of picosecond order, a wavelength converting element 108 made of KDP crystal and a Raman shifter 119 are provided, in addition to the laser 92. A laser beam (fundamental wavelength: 1064 nm) from the Nd:YAG laser device 117 is converted in wavelength into the second harmonics light beam (wavelength $\lambda$2': 532 nm) at the wavelength converting element 118, and then, converted in wavelength into a light beam having the wavelength $\lambda$2 (wavelength $\lambda$2: 566 nm). The light beam is employed as the erasing light. If the Raman shifter 119 is made of Ba(NO$_3$)$_2$, the first stokes light which has the wavelength of 566 nm may be employed as the pumping light.

Figure 27:
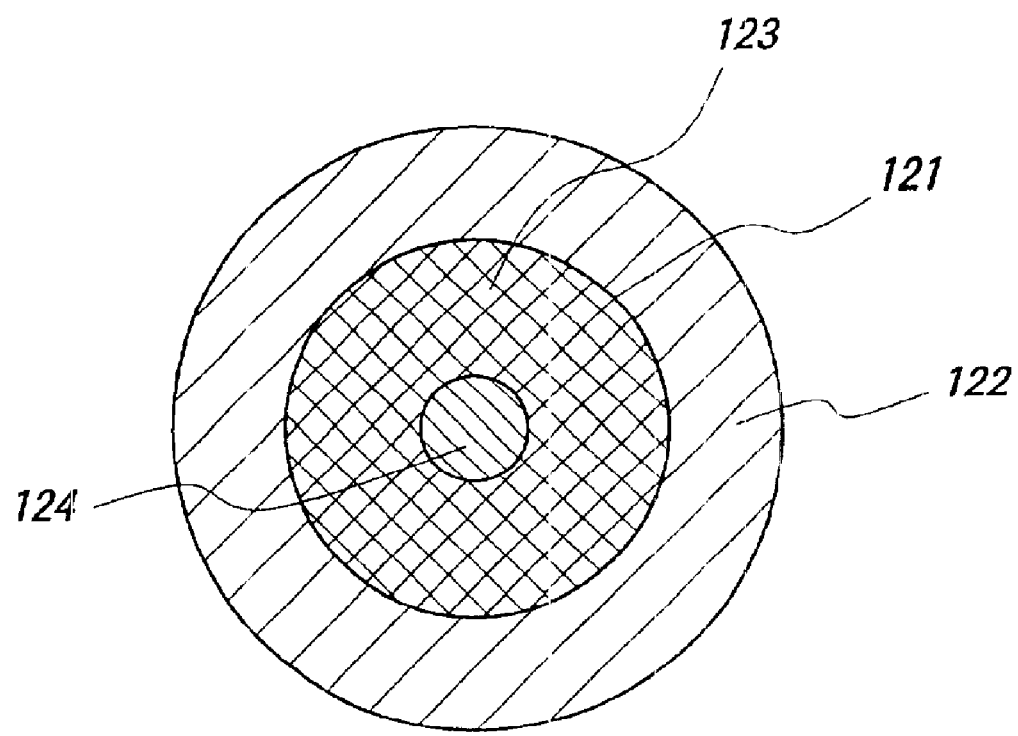
FIG. 27 is a view showing a state where a pumping light and an erasing light are irradiated simultaneously.

As mention above, in order to realize the super resolution observation, in this embodiment, the pumping light from the laser 91 and the erasing light from the laser 92 are combined at the dichroic mirror 93 so that their optical axes are matched, and irradiated onto the sample 97 via the relay lens 94, the half mirror lens 95 and the objective lens 96. In this case, on the sample are overlapped a pumping light spot 121 and a hollow erasing light spot 122, as shown in FIG. 27. Therefore, a fluorescence from the outer ring region which corresponds to the overlapped region between the pumping light spot 121 and the erasing light spot 122 are repressed, and only a fluorescence from the center 124 of the pumping light spot 121 where the erasing light spot is not overlapped. As a result, a given fluorescence signal can be obtained in super resolution from a narrower region than the pumping light spot 121.

Figure 28:
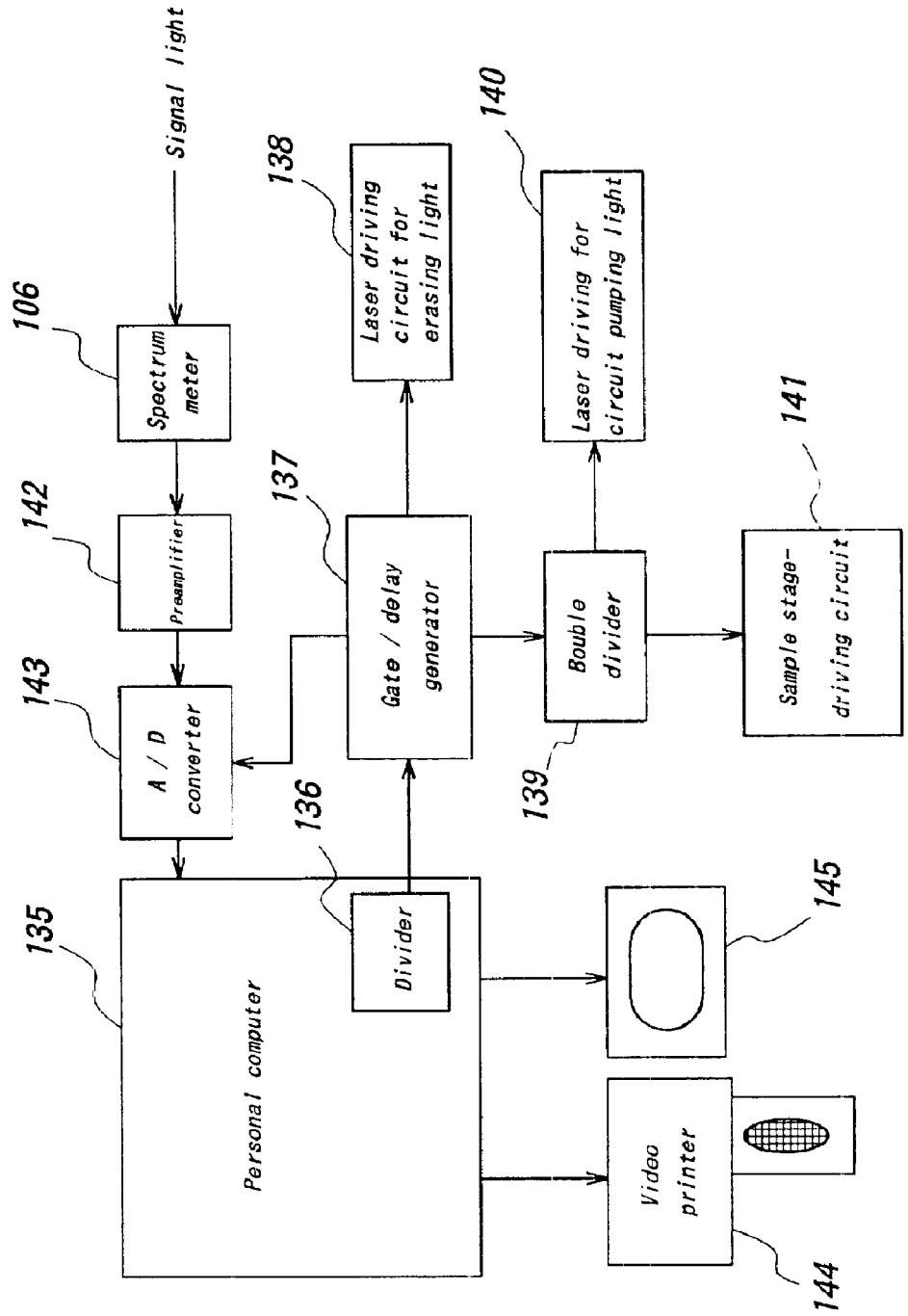
FIG. 28 is a block diagram schematically showing the controlling system of the super resolution laser scanning type fluorescent microscope shown in FIG. 22.

FIG. 28 is a block diagram schematically showing the controlling system of the super resolution laser scanning type fluorescent microscope in this embodiment. In the controlling system, a personal computer 135 is provided, and then, the total operation of the controlling system can be performed at the timing in conformity with the internal clock of the personal computer 135. That is, the frequency of the internal clock is divided at a divider 136 so that the divided frequency can correspond to a laser oscillation frequency, and the thus obtained divided clock signal is supplied to a gate/delay generator 137.

The clock signal is delayed and corrected in wavelength at the gate/delay generator 137, and is supplied to a laser driving circuit 118 for erasing light, to drive and oscillate in pulse mode the ND:YAG laser 117 of the laser device 92 for erasing light. The clock signal from the gate/delay generator 137 is divided into a clock signal of the half frequency at a double divider 139, and is supplied to a laser driving circuit 140 for pumping light, to drive and oscillate the Nd:YAG laser device 115 of the laser device 91 for pumping light, and is supplied to a sample stage driving circuit 141, to drive the sample stage 100 two-dimensionally.

A signal from the spectrum meter 106 is amplified at a preamplifier 142, and synchronized with a clock signal from the gate/delay generator 137 and then, converted into a given digital signal at an A/D converter 143. Then, the digital signal is introduced into the personal computer 135, and processed in image. The thus obtained image data are printed out of a video printer 144 or displayed at a monitor 145 such as CRT.

In this condition, the pumping light is emitted at the double frequency as high as that of the erasing light with synchronized with the erasing light, and the sample stage 100 is moved two-dimensionally at the timing of the emission of the pumping light. Therefore, the irradiation of only the pumping light and the simultaneous irradiation of the pumping light and the erasing light are carried out for onto the sample 97, in turn.

In this embodiment, a fluorescence from each measuring point of the sample 97 when only the erasing light is irradiated is analyzed in spectrum at the transmittive diffraction lattice and detected at the photoelectron multiplier in the spectrum meter 106. The thus obtained output signal, that is, a background signal is amplified at the preamplifier 142, and converted into a given digital signal at the A/D converter 143, to be stored in the memory of the personal computer 135. At the same time, a fluorescence from each measuring point of the sample 97 when the erasing light and the pumping light are irradiated simultaneously is analyzed in spectrum at the transmittive diffraction lattice and detected at the photoelectron multiplier in the spectrum meter 106. The thus obtained image signal is amplified at the preamplifier 142, and converted into a given digital signal at the A/D converter 143, to be stored in the memory of the personal computer 135.

The image signal is subtracted by the background signal at the personal computer 135, and thus, the inherent image signal can be obtained in super resolution. The inherent image signal is printed out of the video printer 144 or displayed at the monitor 145. The above-mentioned differential calculation process may be carried out after or while the sequential scanning for the sample 97 is performed.

In the case that a normal fluorescent image of the sample is observed, the sample 97 is illuminated by the mercury lamp 111, and the thus obtained fluorescent image is photographed by the CCD camera 112, to be displayed at the monitor 145 or printed out of the video printer 144 as occasion demands.

Although the present invention will be described in detail, with reference to the embodiment as mentioned above, the present invention is not limited to the above embodiment, and every kind of variation and modification may be made for the embodiment. In the above embodiment, for example, although the pulse frequency of the erasing light is set double as that of the pumping light, it may be set three times or over. Moreover, the pulse frequency of the erasing light may be set equal to that of the pumping light, and the pulse width of the erasing light is set larger than that of the pumping light. In this case, at each measuring point of the sample, a background signal when only the erasing light is irradiated and a image signal when the erasing light and the pumping light are irradiated simultaneously are measured. Then, the differential calculation is performed for the background signal and the image signal, to obtain the inherent image signal in super resolution.

At present, such a scanning stage as having a position controlling accuracy of 10 nm is available. Therefore, if the sample stage 100 is constructed of such a scanning stage, the emission of the pumping light, the emission of the erasing light and the operation of the sample stage 100 could be controlled by their respective driving signal having the same frequency. In this case, at first, a given background signal is obtained from a measuring region of the sample 97 by irradiating only the erasing light and moving the sample stage 100 two-dimensionally. Then, a given image signal is obtained from the measuring region by irradiating the erasing light and the pumping light simultaneously and moving the sample stage 100 two-dimensionally. Thereafter, the image signal is subtracted by the background signal to obtain the inherent image signal.

As mentioned above, according to the microscope of the present invention, a first light to transit a molecule of a sample to a higher energy level vibration state which belongs to a lowest energy level electron state from the ground state and a second light to transit the molecule to a higher energy quantum state from the vibration state are employed. Then, the first light and the second light are partially and spatially overlapped and irradiated onto the sample, to detect a fluorescence from the irradiated region. Therefore, without a far ultraviolet light source, a given chemical group which is characterized by a given vibration can be detected in high resolution below the optical diffraction limit.

What is claimed is:

1. A super resolution microscope comprising:
    a first light source to emit a first light to excite a molecule of a sample from a ground state to a higher energy level vibration state which belongs to a lowest energy level electron state,
    a second light source to emit a second light to excite said molecule from said higher energy vibration state to a higher energy level quantum state,
    a phase modulate filter system for spatially modulating an intensity of said first and second lights,
    an optical system to overlap a part of an irradiation region of said first light and a part of an irradiation region of said second light partially on said sample, such that an overlapped portion of the irradiated regions of the first and second lights modulated in intensity by the phase modulate filter system is narrower than beam sizes of the first and the second lights, and
    an optical detector to detect a given fluorescence from the irradiated region of said first light and said second light overlapped by said optical system on said sample,
    wherein a resolution of the overlapped portion of the irradiated regions is higher than a resolution of the beam sizes of the first and second lights.

2. The super resolution microscope of claim 1, wherein said first light source emits one of an infrared light and a near infrared light which has a wavelength of at least 700 nm.

3. The super resolution microscope of claim 1, wherein at least one of said first light source and said second light source comprises a pulsed light source.

4. The super resolution microscope of claim 3, wherein said first light source and said second light source comprise coherent light sources, respectively.

5. The super resolution microscope of claim 4, wherein at least one of said first light source and said second light source comprises a wavelength-variable light source.

6. The super resolution microscope of claim 1, wherein a wavelength of said first light is set to one of a fundamental vibration and over tone of vibration of a chemical group selected from the group consisting of —CH, —NH, —OH, C=C, C=O, —$CH_2$, —CHOH and —CN.

7. The super resolution microscope of claim 1, wherein said optical detector detects a difference between a luminance detected from said sample when said first light and said second light are irradiated onto said sample so as to be partially overlapped on said sample and a luminance detected from said sample when only said second light is irradiated onto said sample.

8. The super resolution microscope of claim 7, wherein said first light source and said second light source comprise pulsed light sources having a same pulse frequency, and wherein a pulse width of said second light from said second light source is set larger than a pulse width of said first light from said first light source.

9. The super resolution microscope of claim 7, wherein said first light source and said second light source comprise pulsed light sources having a same pulse frequency, and wherein a pulse frequency of said second light source is set to integral number multiples of a pulse frequency of said first light source so that said first light source and said second light source oscillate simultaneously.

10. The super resolution microscope of claim 7, wherein a background luminance is detected by scanning said second light on said sample and detecting one of a luminance and a scattered light from said sample, wherein a signal luminance is detected by scanning said first light and said second light simultaneously on said sample and detecting from said sample, and wherein said signal luminance is subtracted by said background luminance, to obtain the inherent signal luminance.

11. The super resolution microscope of claim 1, wherein said phase modulate filter system comprises a plurality of regions for modulating a phase of said first and second lights, respectively, to another phase.

12. The super resolution microscope of claim 11, wherein in a region adjacent to said plurality of regions of said phase modulate filter system, phase modulation is performed so as to effect a phase shift by $\pi$.

* * * * *